(12) United States Patent
Son et al.

(10) Patent No.: US 9,209,473 B2
(45) Date of Patent: Dec. 8, 2015

(54) ANODE-SUPPORTED SOLID OXIDE FUEL CELL COMPRISING A NANOPOROUS LAYER HAVING A PORE GRADIENT STRUCTURE, AND A PRODUCTION METHOD THEREFOR

(75) Inventors: Ji-Won Son, Seoul (KR); Ho-Sung Noh, Seoul (KR); Hae-Weon Lee, Seoul (KR); Jong Ho Lee, Seoul (KR); Hae-Ryoung Kim, Seoul (KR); Jong Cheol Kim, Daegu (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 974 days.

(21) Appl. No.: 13/256,769

(22) PCT Filed: Mar. 16, 2010

(86) PCT No.: PCT/KR2010/001620
§ 371 (c)(1),
(2), (4) Date: Sep. 15, 2011

(87) PCT Pub. No.: WO2010/107228
PCT Pub. Date: Sep. 23, 2010

(65) Prior Publication Data
US 2012/0003565 A1    Jan. 5, 2012

(30) Foreign Application Priority Data

Mar. 16, 2009  (KR) .................. 10-2009-0022365
Mar. 19, 2009  (KR) .................. 10-2009-0023390

(51) Int. Cl.
*H01M 8/10*   (2006.01)
*H01M 4/48*   (2010.01)
(Continued)

(52) U.S. Cl.
CPC ............ *H01M 8/1206* (2013.01); *H01M 4/861* (2013.01); *Y02E 60/521* (2013.01); *Y02E 60/525* (2013.01)

(58) Field of Classification Search
USPC ................... 429/479, 481, 489, 508; 977/773
IPC ........... H01M 8/10,8/1016, 8/1286, 2008/1293, H01M 8/1097
See application file for complete search history.

(56) References Cited

U.S. PATENT DOCUMENTS 5,114,803 A    5/1992  Ishihara et al.
5,656,387 A *  8/1997  Barnett et al. ................ 429/482
(Continued)

FOREIGN PATENT DOCUMENTS

JP   2002-175814 A   6/2002
JP   2003-217597 A   7/2003
(Continued)

OTHER PUBLICATIONS

Lugard C. DeJonghe, et al; "Supported Electrolyte Thin Film Synthesis of Solid Oxide Fuel Cells" Annu. Rev. Mater. Res. 2003. 33:169-82; doi: 10.1146/annurev.matsci.33.041202.103842; First published online as a Review in Advance on Feb. 18, 2003.
(Continued)

*Primary Examiner* — Patrick Ryan
*Assistant Examiner* — Julian Anthony
(74) *Attorney, Agent, or Firm* — Ladas & Parry LLP

(57) ABSTRACT

The present invention relates to a solid oxide fuel cell having a gradient structure in which pore size becomes gradually smaller from a porous electrode to an electrolyte thin film in order to form a dense electrolyte thin film of less than about 2 microns and preferably less than 1 micron on the porous electrode.

23 Claims, 15 Drawing Sheets

(51) Int. Cl.
*H01M 2/08* (2006.01)
*H01M 2/14* (2006.01)
*H01M 8/12* (2006.01)
*H01M 4/86* (2006.01)

(56) References Cited

U.S. PATENT DOCUMENTS

| | | |
|---|---|---|
| 6,228,521 B1 | 5/2001 | Kim et al. |
| 6,638,654 B2 | 10/2003 | Jankowksi et al. |
| 6,653,009 B2 * | 11/2003 | Wang et al. ............... 429/469 |
| 7,226,691 B2 * | 6/2007 | Shibata et al. ............. 429/480 |
| 7,534,519 B2 | 5/2009 | Cable et al. |
| 2007/0184322 A1 | 8/2007 | Huang et al. |
| 2008/0131175 A1 | 6/2008 | Shin et al. |
| 2008/0131752 A1 | 6/2008 | Hwang |
| 2009/0061272 A1 * | 3/2009 | Blennow et al. ............ 429/27 |

FOREIGN PATENT DOCUMENTS

| | | |
|---|---|---|
| JP | 2007-165143 A | 6/2007 |
| JP | 2007-299690 A | 11/2007 |
| JP | 2008-004422 A | 1/2008 |
| JP | 2009-206080 A | 9/2009 |
| KR | 20040026180 A | 3/2004 |
| KR | 1020070019868 A | 2/2007 |
| KR | 20070037254 A | 4/2007 |
| KR | 1020100041348 A | 4/2010 |

OTHER PUBLICATIONS

International Search Report; mailed Oct. 25, 2010; PCT/KR2010/001620.

* cited by examiner

Anode Functional Layer (a)                              (b)

| operation temperature (°C) | thin film electrolyte SOFC output density ($P_{max}$, mW/cm²) | thick film electrolyte SOFC output density ($P_{max}$, mW/cm²) |
|---|---|---|
| 600 | 906 | 432 |
| 550 | 605 | 213 |
| 500 | 297 | 92 |
| 450 | 116 | 21 |
| 400 | 44 | 6 |
| 350 | 11 | NA |

(a)                          (b)

ANODE-SUPPORTED SOLID OXIDE FUEL CELL COMPRISING A NANOPOROUS LAYER HAVING A PORE GRADIENT STRUCTURE, AND A PRODUCTION METHOD THEREFOR

TECHNICAL FIELD

The present invention relates to an anode-supported solid oxide fuel cell comprising a nano-porous layer having a pore-gradient structure and a fabrication method thereof.

BACKGROUND ART

A solid oxide fuel cell (SOFC) using a solid oxide, i.e., a ceramic material, has high efficiency compared with other fuel cells, and since it can use various types of fuel besides hydrogen, the SOFC has been developed mainly for the purpose of large scale power generation. Recently, as demand for mobile power having high output and high energy density is on the rise, development of a small SOFC as a small mobile power source is paid much attention.

In order to enhance cost-effectiveness of an SOFC for the purpose of large scale power generation and implement a small SOFC, it is required to lower a current operational temperature ranging from 800° C. to 1000° C. The high operational temperature causes an interface reaction, degrades performance due to thermal expansion mismatching between constituents such as electrolyte, electrodes, a sealing material, and the like, and limits materials and components which may be used, degrading economic feasibility. In particular, when the SOFC is applied as a mobile power source, lowering of the operational temperature is crucial. In this respect, however, the lowering of the operational temperature lowers conductivity of electrolyte or activity of a catalyst to result in a reduction in performance, so, in order to cancel it out, a new material is required to be employed or the structure is required to be changed.

In particular, compensation for the reduction in the conductivity of electrolyte according to the lowering of the operational temperature by lowering resistance by reducing the thickness of electrolyte is one of important research fields. In case of the most commonly used electrolyte, yttria stabilized zirconia (YSZ), when it has the current thickness of a few microns, it can have satisfactory performance at an operational temperature of about 700° C. or higher, but when the thickness of the YSZ is reduced to below 1 micron, YSZ can be operable even at 500° C. or lower.

In order to use an electrolyte thin film layer, generally, the electrolyte thin film is deposited on a dense substrate such as a silicon wafer, and then, a free-standing membrane is generated by using an MEMS process to implement a fuel cell (U.S. Pat. No. 6,638,654 B2, US 2007-0184322A, etc.). However, such a membrane type fuel cell is structurally very vulnerable, and in particular, it cannot avoid thermal, mechanical vulnerability at an operational temperature of hundreds of degrees Celsius and heat cycle. Thus, it is advantageous to implement an electrolyte thin film layer on a support having a porous structure in terms of thermal, mechanical stability and long-term stability.

However, when an electrolyte layer is formed on the porous substrate, when the thickness of the thin film is smaller than the size of pores, a defect is generated due to the pores (DeJonghe et al., Annu. Rev. Mater. Res. 2003. 33:169-82). Thus, it is not possible, in actuality, to form a dense electrolyte layer having a thickness of 1 micron or smaller on the existing porous substrate having the size of pores of a few microns.

When a general anode support is used as a substrate, starting powder has a size of microns, and as a sintering temperature reaches about 1000° C., the size of particles has a few microns. In this case, a surface roughness and the size of pores have a few microns, so in order to cover them with a completely dense membrane without having gas permeability, the thickness of the electrolyte layer is required to correspond to the size of the pores or greater.

Thus, in order to use a thin-film electrolyte, controlling of the pore structure at the support part in contact with the electrolyte layer is requisite. Here, in order to resolve this, if the entirety of the support is implemented to have a structure having a particle size or a pore size of micron or lower, there is much restriction in terms of process to control a microstructure, causing very complicated processes and an instruction of gas is hampered to degrade the performance of the SOFC.

Also, although the pore structure and surface roughness of the porous electrode substrate are controlled, if the difference in sintering shrinkage between the substrate and the electrolyte layer and a defect such as disintegration of the electrolyte layer due to a grain growth are not restrained in the electrolyte layer formation process, the occurrence of a fatal defect in the electrolyte layer cannot be avoided. Since shrinkage generated in the electrolyte layer in a drying and sintering process, or the like, is greater than that of the rigid substrate, tensile stress is generated in the electrolyte layer, inevitably causing a defect.

A method for implementing the porous support having a gradient structure is also disclosed in U.S. Pat. Nos. 5,114,803 and 6,228,521. 5,114,803 particularly relates to a method for forming a gradient structure to improve diffusion and a three-phase boundary at an electrode support in a cathode-supported tubular SOFC. In this patent, a general powder process and a high sintering temperature (>1300° C.) are used, so although a gradient structure is formed, it is impossible to form a dense electrolyte layer within 1 micron at an upper portion of a porous electrode. Also, in the embodiment of the patent, the thickness of electrolyte is 100 microns. U.S. Pat. No. 6,228,521 presents a gradient structure having a lower portion containing a large amount of nickel (Ni) compared with a general composition and an upper portion containing a smaller amount of nickel (Ni) in order to obtain high porosity at a lower portion of an Ni-YSZ porous substrate and enlarge the three-phase boundary at a portion in contact with electrolyte. In this patent, however, the gradient structure is formed at high temperature through the existing powder process, and surface roughness, pore size, a pore size distribution, and the like, are not adjusted, so a thin film electrolyte layer cannot be formed at an upper portion.

DISCLOSURE

Technical Problem

Therefore, an object of the present invention is to provide a solid oxide fuel cell having a pore gradient structure in which a pore size is smaller than the thickness of an electrolyte layer, which has a thickness of about 2μm or smaller, preferably, about 1 micron or smaller, by gradually reducing the pore size from a lower portion of a porous electrode to the electrolyte layer, in order to form the thin-film electrolyte layer densely on the porous electrode without a defect.

Another object of the present invention is to provide a method for properly controlling surface roughness, a pore size, a distribution of pore size, and the like, at a porous electrode part in contact with an electrolyte layer and preventing an occurrence of a defect due to the difference in a sintering shrinkage at an interface of the porous electrode and the electrolyte layer.

Technical Solution

According to an aspect of the present invention, there is provided (1) an anode-supported solid oxide fuel cell, comprising: a porous anode support, an electrolyte layer, and a nano-porous layer disposed between the porous anode support and the electrolyte layer wherein a size of pores of a surface of the nano-porous layer in contact with the electrolyte layer is smaller than a size of pores in the porous anode support and the thickness of the electrolyte layer.

According to another aspect of the present invention, there is provided (2) a method for fabricating an anode-supported solid oxide fuel cell, the method comprising: (a) forming a composite thin film including a ceramic for electrolyte and a metal oxide for electrode on a porous anode support; (b) post-annealing the composite thin film; (c) forming an electrolyte layer on the post-annealed composite thin film; and (d) forming a nano-porous layer by reducing the composite thin film.

In the method (2) for fabricating the anode-supported solid oxide fuel cell, it is applying a composite nano-powder slurry, in which ceramic nano-powders for an electrolyte and nano-powders of a metal oxide are dispersed, on a porous anode support to form a thin film, drying the thin film and sintering the same before the step (a) for having a nano-porous anode functional layer with a two-step gradient structure in the anode-supported solid oxide fuel cell.

According to another aspect of the present invention, there is provided (4) a method for fabricating the solid oxide fuel cell, comprising: (a) forming a coated film of a ceramic and a metal oxide on a porous anode support by applying a composite nano-powder slurry, in which ceramic nano-powders for an electrolyte and nano-powders of a metal oxide are dispersed, and drying the same; (b) sintering the coated film; and (c) forming an electrolyte layer on the coated film.

Advantageous Effects

According to embodiments of the present invention, the nano-porous layer having pores, whose size is tens to hundreds nano-meter, is formed as a single layer or a multi-layer between the porous support having pores at a few micron level and a dense thin-film electrolyte layer without a pore. And a surface roughness, a pore size, and a distribution of the pore size, or the like, of the nano-porous layer in contact with the dense electrolyte layer are appropriately controlled, thus it can be improving cost-effectiveness of the SOFC for large scale power generation or implementing a small SOFC. In this case, the nano-porous layer may be an electrode functional layer of the SOFC, may be an electrolyte layer, or may have a multi-layered structure including the electrode functional layer and the electrolyte layer.

Also, in the present invention, the size of particles and pores in the porous electrode as a support are gradually changed, and a microstructure and the size of pores in contact with the electrolyte are adjusted to be sufficient to form a dense electrolyte layer having a thickness of 1 micron or smaller thereon, whereby an excellent structural stability even at high temperature can be obtained and shortcomings in the aspect of thermal, mechanical stability and long-term stability of the free-standing membrane structure of the SOFC using an existing electrolyte layer can be solved.

Also, the process complexity and a high cost implemented a porous electrode structure as a sub-micron structure, and a degradation of performance due to hindrance of gas transport can be solved.

In particular, since this technique is implemented by using processes available for integration and mass-production, such as a fine ceramic process, a vacuum deposition process and/or a solution process, portability and expandability to a different technique and generality (compatibility) with a different technique are excellent. It can be easily utilized in and extended to a different field such as a sensor, a membrane, and the like, requiring a dense thin film structure on a porous substrate as well as an SOFC.

Also, since the SOFC according to an embodiment of the present invention operates at low temperature, there is not much restriction to materials which may be used, and a problem such as a reaction, made at high temperature, or the like, can be avoided, accomplishing excellent economic feasibility and reliability. In particular, when the low temperature operation is available, the burden of heat management is reduced, thus reducing the size to implement a small SOFC, and such a small SOFC has high energy density and high output density as a next-generation portable and mobile power supply device to create a high economical value which can replace an existing portable power source.

BEST MODES

Figure 1:
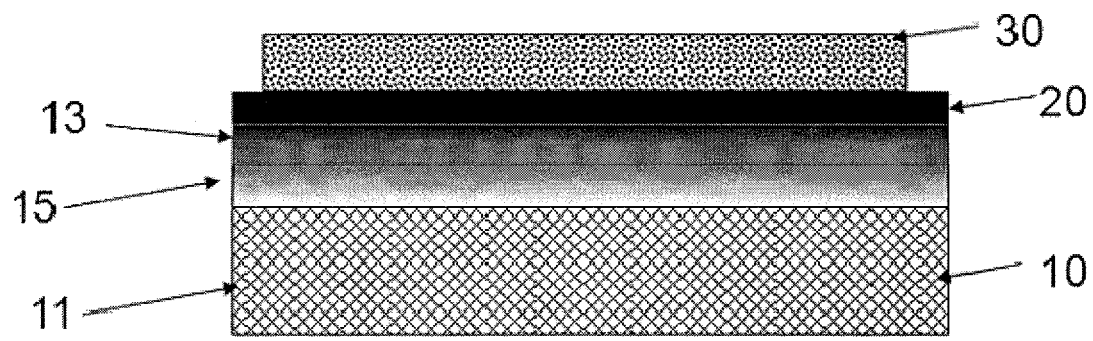
FIG. 1 is a cross-sectional schematic of a solid oxide fuel cell (SOFC) including a porous anode support and a nano-porous anode functional layer according to an embodiment of the present invention.

The present invention relates to an anode-supported solid oxide fuel cell comprising: a porous anode support, an electrolyte layer, and a nano-porous layer disposed between the porous anode support and the electrolyte layer, wherein a size of pores at a surface of the nano-porous layer, in contact with the electrolyte layer is smaller than a size of pores in the porous anode support and the thickness of the electrolyte layer.

The porous anode support may be made of a material selected from the group consisting of (1) metal such as nickel (Ni), ruthenium (Ru), palladium (Pd), rhodium (Rd), platinum (Pt), or the like, and an alloy thereof, (2) a cermet composite of a metal (or an alloy thereof) selected from (1) and SOFC electrolyte material such as a doped zirconia such as yttria stabilized zirconia (YSZ), scandia stabilized zirconia (ScSZ), or the like, and doped ceria such as gadolinia doped ceria (GDC), samarium doped ceria (SDC), or the like, and (3) a ruthenium oxide, but the present invention is not limited thereto.

The nano-porous layer includes a cermet composite of a ceramic for electrolyte and a metal. Here, the ceramic for electrolyte is one or more selected from the group consisting of yttria stabilized zirconia (YSZ), scandia stabilized zirconia (ScSZ), gadolinia doped ceria (GDC), samarium doped ceria (SDC), strontium manganese doped lanthanum gallate (LSGM), and silver yttria doped bismuth (YDB) oxide, and the metal is any one selected from nickel (Ni), ruthenium (Ru), palladium (Pd), rhodium (Rd), platinum (Pt), or the like, and an alloy thereof, and the ceramic for electrolyte and the metal constitute a cermet composite, but the present invention is not limited thereto.

The electrolyte layer is an ion conductor selected from proton conducting materials and oxygen ion conducting materials selected from the group consisting of a zirconium oxide ($ZrxOy$), a cerium oxide ($CexOy$), lanthanum gallate, barium cerate, barium zirconate, a bismuth-based oxide, and a combination thereof. For example, one of more is selected from the group consisting of yttria stabilized zirconia (YSZ), scandia stabilized zirconia (ScSZ), gadolinia doped ceria (GDC), samarium doped ceria (SDC), strontium manganese doped lanthanum gallate (LSGM), and silver yttria doped bismuth oxide (YDB), but the present invention is not limited thereto.

A cathode of the anode supported solid oxide fuel cell (SOFC) may be made of a composite of (1) a material selected from the group consisting of platinum (Pt), gold (Au), silver (Ag), lanthanum oxide-based perovskite such as a lanthanum-strontium manganese (LSM) oxide, a lanthanum-strontium cobalt (LSC) oxide, a lanthanum-strontium iron (LSF) oxide, lanthanum-strontium cobalt iron (LSCF) oxide, a samarium-strontium cobalt (SSC) oxide, and a bismuth-ruthenium oxide, and (2) an SOFC electrolyte material such as doped zirconia such as yttria stabilized zirconia (YSZ), scandia stabilized zirconia (ScSZ), or the like, and doped ceria such as gadolinia doped ceria (GDC), samarium doped ceria (SDC), or the like, but the present invention is not limited thereto.

In the present invention, a size of pores in the nano-porous layer is smaller than a size of pores of the porous support. Namely, the SOFC according to an embodiment of the present invention has a multi-layered pore-gradient structure in which the size of pores diminishes toward a dense electrolyte layer from the porous support and the nano-porous layer. Also, the size of pores at a surface of the nano-porous layer in contact with the electrolyte layer is smaller than the thickness of the electrolyte layer, and that is to prevent the electrolyte layer from being depressed or having a pin-hole.

An average size of the pores of the nano-porous layer may range from 30 nm to 300 nm. Also, the thickness of the electrolyte layer may be greater than a size of the pores at the part of the nano-porous layer in contact with the electrolyte layer and smaller than 2 µm, preferably, smaller than 1 µm.

In order to lower the operation temperature of the SOFC, the thickness of the dense electrolyte layer should be reduced to be smaller than about 2 µm, preferably, 1 µm, and to this end, the size of pores at the surface of the nano-porous layer in contact with the electrolyte layer is required to be controlled to be tens to hundreds nano-meter, and a surface roughness and a pore size distribution at the surface of the nano-porous layer in contact with the electrolyte layer are required to be properly controlled. Also, in order to secure structural stability of the SOFC, a generation of a defect due to the difference in sintering shrinkage on each interface within the multi-layered structure should be prevented.

The nano-porous layer may be implemented at an electrode part or at a part of the electrolyte as necessary, and it may be implemented on the entirety of the electrode and electrolyte part as necessary. Namely, the nano-porous layer may be an electrode functional layer (e.g., an anode functional layer) of the SOFC or an electrolyte layer, and may have a multi-layered structure including the electrode functional layer and the electrolyte layer.

Also, the nano-porous layer may have a mono-layered structure or have a multi-layered structure (i.e., including two or more layers) having a pore-gradient structure in which the size of pores is reduced by layer toward the electrolyte layer. The porous anode support may also have a mono-layered structure or a multi-layered structure (including, e.g., two or more layers) having a pore-gradient structure in which the size of pores diminishes by layer toward the nano-porous layer, thus sequentially reducing the size of pores.

FIG. 1 shows the structure of a solid oxide fuel cell (SOFC) according to an embodiment of the present invention.

As shown in FIG. 1, the SOFC according to an embodiment of the present invention includes a porous anode 10, an electrolyte layer 20, and a cathode 30. The porous anode 10 includes a porous anode support 11 and a nano-porous anode functional layer 13.

In an embodiment of the present invention, in order to densely form the electrolyte layer (e.g., a layer which has a thickness of about 2 microns, preferably, about 1 micron or smaller) on the porous anode 10 without a defect, the size of pores is gradually reduced from a lower portion of the porous anode 10 up to the electrolyte layer 20 such that the size of pores on the surface in contact with the electrolyte layer 20 is eventually smaller than the thickness of the electrolyte layer 20. In this case, the porous anode 10 may have a multi-layered structure, and the size of pores of each layer may be gradually reduced.

Figure 2:
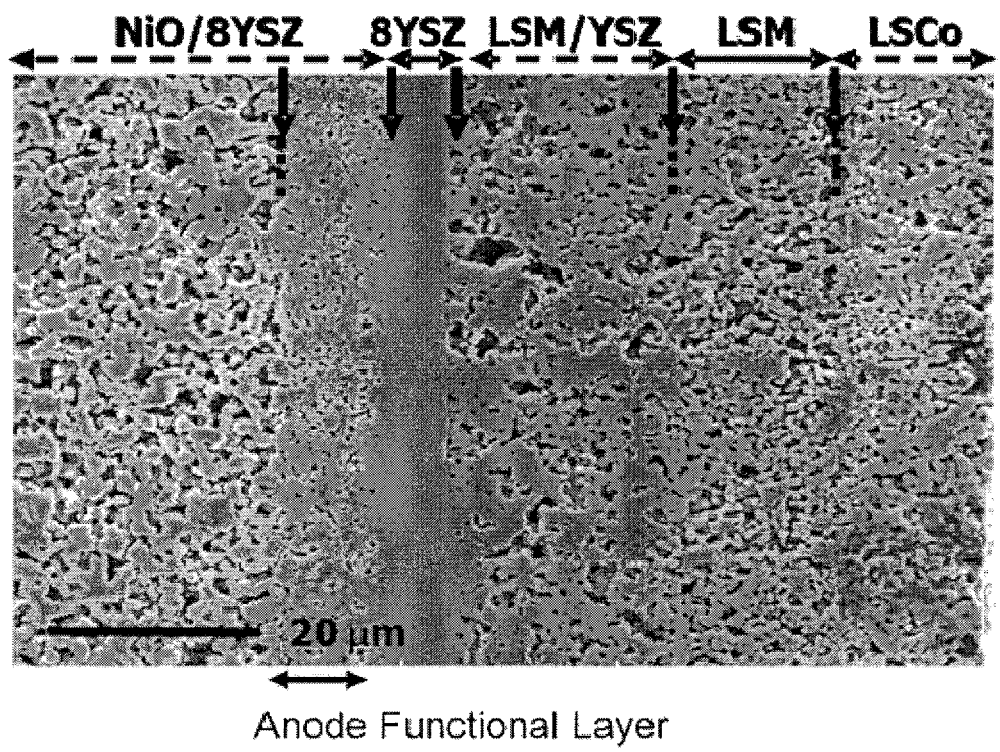
FIG. 2 shows a cross-sectional structure of a general SOFC manufactured by using the related art conventional powder process.
Figure 3:
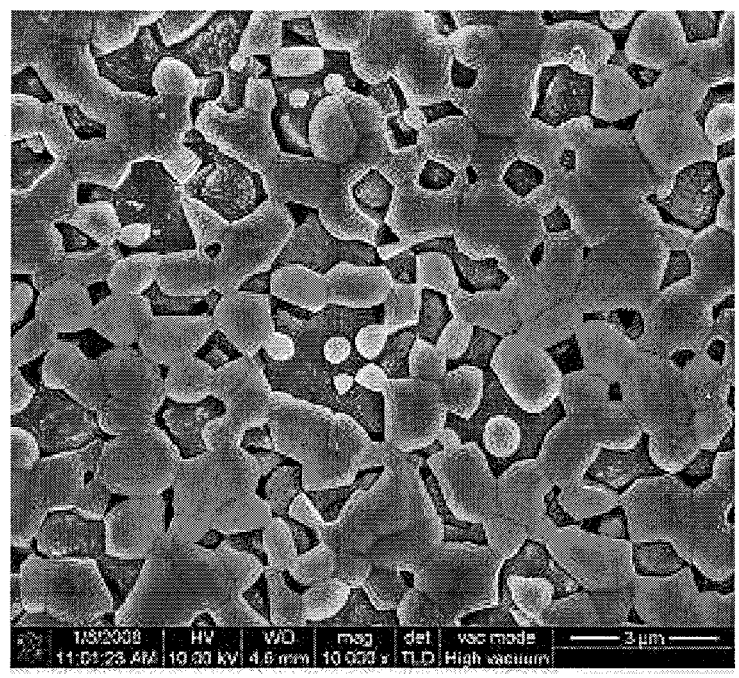
FIG. 3 is a view showing a microstructure on a surface of an anode functional layer of an SOFC after reduction according to the related art.

FIG. 2 shows a cross-sectional structure of a SOFC implemented by using a conventional bulk process. The structure includes an anode functional layer (F.L.), having porosity and the size of pores reduced to be smaller than those of the anode support, formed between the dense electrolyte (8YSZ) and the porous-anode support (NiO/8YSZ). FIG. 3 shows the surface after the anode functional layer of the related art SOFC was reduced. It is noted that the size of pores and particles formed after reduction reach a few microns. The structure of the anode functional layer which has become denser than the anode support, a lower layer, and the reduced size of pores of the anode functional layer improve thermal, mechanical, and structural compatibility (or matching properties) with the electrolyte, whereby the electrolyte layer having a thickness of about 5 microns to 10 microns can be stably formed. However, since the size of the pores in the anode functional layer exceeds 1 micron, it is desired to be formed an electrolyte layer having a thickness of 2 microns, preferably, 1 micron or smaller, for a low temperature operation, and the anode substrate, which is manufactured according to the general method as described above, cannot be used as a support.

Thus, in order to use a dense electrolyte layer having a thickness of 2 microns, preferably, one micron or smaller, the surface on which the electrolyte layer is to be coated (namely, an upper surface of the anode functional layer), a size of pores and particles is required to be micron or smaller and to have enough smoothness.

To this end, in the present invention, a dense composite thin film using a ceramic (e.g., YSZ) as an electrolyte material, and a metal oxide (e.g., NiO) as a material of an anode, is formed on the porous anode support 11, and the composite thin film is post-annealed to form a ceramic skeleton having a sufficient strength, and then, the electrolyte layer 20 is formed on the composite thin film. Thereafter, the multi-layered structure is reduced to form the nano-porous anode functional layer 13 made of a composite of a ceramic and metal between the anode support 11 and the electrolyte layer 20, wherein the nano-porous anode functional layer has nano-pores having sub-micron size and the sub-micron size is smaller than the size of pores of the anode support 11.

In the composite thin film, the ceramic skeleton works as a structural support in which ceramics (e.g., YSZ) constituting the composite thin film are connected to each other, and since the skeleton has a sufficient strength through the post-annealing treatment at a sufficient temperature (e.g., 1000° C. to 1300° C.), the metal (e.g., Ni) is prevented from agglomeration or coarsening in the reduction treatment.

The anode functional layer 13 may be coated in the form of a thin film through vacuum deposition, so, preferably, the surface, on which the anode functional layer 13 is coated, has small surface roughness (namely, is smooth). If the surface, on which the anode functional layer 13 is coated, has high surface roughness (namely, if it is rough), a planarization layer (not shown) having small pores smaller than the size of the pores of the anode support 11 may be additionally formed to be in contact with a lower surface of the anode functional layer. Such a planarization layer may be obtained by depositing composite nano-powder of an anode raw material and an electrolyte raw material through a spray method or a spin-coating method, and then, sintering the same at an appropriate temperature (e.g., 1000° C. to 1300° C.). However, the present invention is not limited thereto.

In this manner, in the anode-supported SOFC according to an embodiment of the present invention, the size of pores and surface roughness diminish from the porous anode support 11 toward upper layers, wherein the size of pores is a few to tens microns and surface roughness is smaller, and finally, the size of pores and surface roughness are controlled to be hundreds nano-meters or smaller on the upper surface of the nano-porous anode functional layer 13, and accordingly, the dense electrolyte layer 20 of one micron or smaller can be formed on the upper portion of the anode functional layer 13.

Here, an average size of pores in the anode functional layer may range from 30 nm to 300 nm. Also, an average size of particles in the anode functional layer may range from 30 nm to 300 nm. If the average size of pores is smaller than 30 nm, transport of gas such as fuel, an oxidizing agent, or the like, is not enough, and if the average size of pores is greater than 300 nm, it is difficult to form the electrolyte layer of 1 micron or smaller, and even if such an electrolyte layer is formed, thermal, mechanical vulnerability cannot be avoided in the process of operating the fuel cell later. The nano-porous anode functional layer 13 is formed in the form of a thin film through a vacuum deposition, so a problem of shrinkage mismatching with the electrolyte layer 20 formed thereon does not arise.

Also, in an embodiment of the present invention, there is much difference in the size of pores between the anode support 11 and the nano-porous anode functional layer 13, as shown in FIG. 1. A porous intermediate layer 15 which may be additionally formed between the anode support 11 and the anode functional layer 13 has pores smaller than a size of pores of the anode support 11 and larger than a size of pores of the anode functional layer 13. The porous intermediate layer 15 may be formed through any one selected from a screen printing method, a slurry coating method, an electrostatic spray deposition, a pressurized spray deposition, spray pyrolysis, or the like.

The porous intermediate layer 15 may be made of the same material of which the porous anode support is made. Namely, it may be made of a material selected from the group consisting of (1) metal such as nickel (Ni), ruthenium (Ru), palladium (Pd), rhodium (Rd), platinum (Pt), or the like, and an alloy thereof, (2) a cermet composite of the metal (or an alloy thereof) of (1) and an SOFC electrolyte material such as a doped zirconia such as yttria stabilized zirconia (YSZ), scandia stabilized zirconia (ScSZ), or the like, and doped ceria such as gadolinia doped ceria (GDC), samarium doped ceria (SDC), or the like, and (3) a ruthenium oxide, but the present invention is not limited thereto.

A first method for fabricating a solid oxide fuel cell (SOFC) according to an embodiment of the present invention is comprising (a) forming a composite thin film including a ceramic for electrolyte and a metal oxide for electrode on a porous anode support, (b) post-annealing the composite thin film, (c) forming an electrolyte layer on the post-annealed composite thin film and (d) forming a nano-porous layer by reducing the composite thin film.

The ceramic for electrolyte may be one or more selected from the group consisting of yttria stabilized zirconia (YSZ), scandia stabilized zirconia (ScSZ), gadolinia doped ceria (GDC), samarium doped ceria (SDC), strontium manganese doped lanthanum gallate (LSGM), and silver yttria doped bismuth (YDB) oxide, and the metal oxide for electrode may be an oxide of metal selected from the group consisting of nickel (Ni), ruthenium (Ru), palladium (Pd), rhodium (Rd), platinum (Pt), and an alloy thereof.

As described above, when the electrolyte layer 20, which is having a thickness of 2 microns or smaller, preferably, 1 micron or smaller, is formed on the porous anode 10, it is required the anode functional layer 13 in contact with the electrolyte layer 20 to have a nano-porous structure in order to obtain structural stability and effective electrode activity.

In the present invention, to this end, a ceramic and a metal oxide are vacuum-deposited on the porous anode support to form a composite thin film in step (a).

Figure 4:
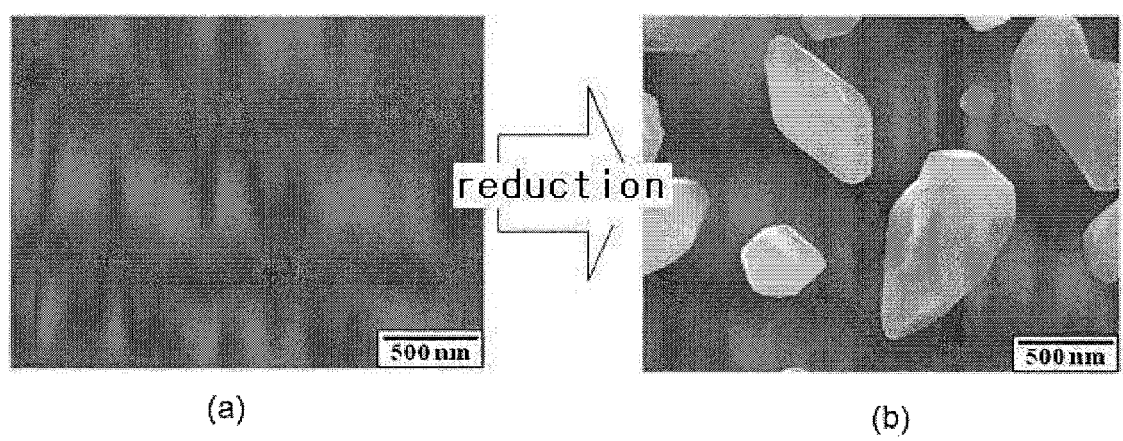
FIG. 4 is a view showing a surface microstructure (a) of an NiO—YSZ thin film after the NiO—YSZ thin film was deposited by a PLD method while a substrate temperature was maintained at 700° C. and a post-annealing process was not performed thereon, and a surface microstructure (b) of the NiO—YSZ thin film after a reduction.
Figure 5:
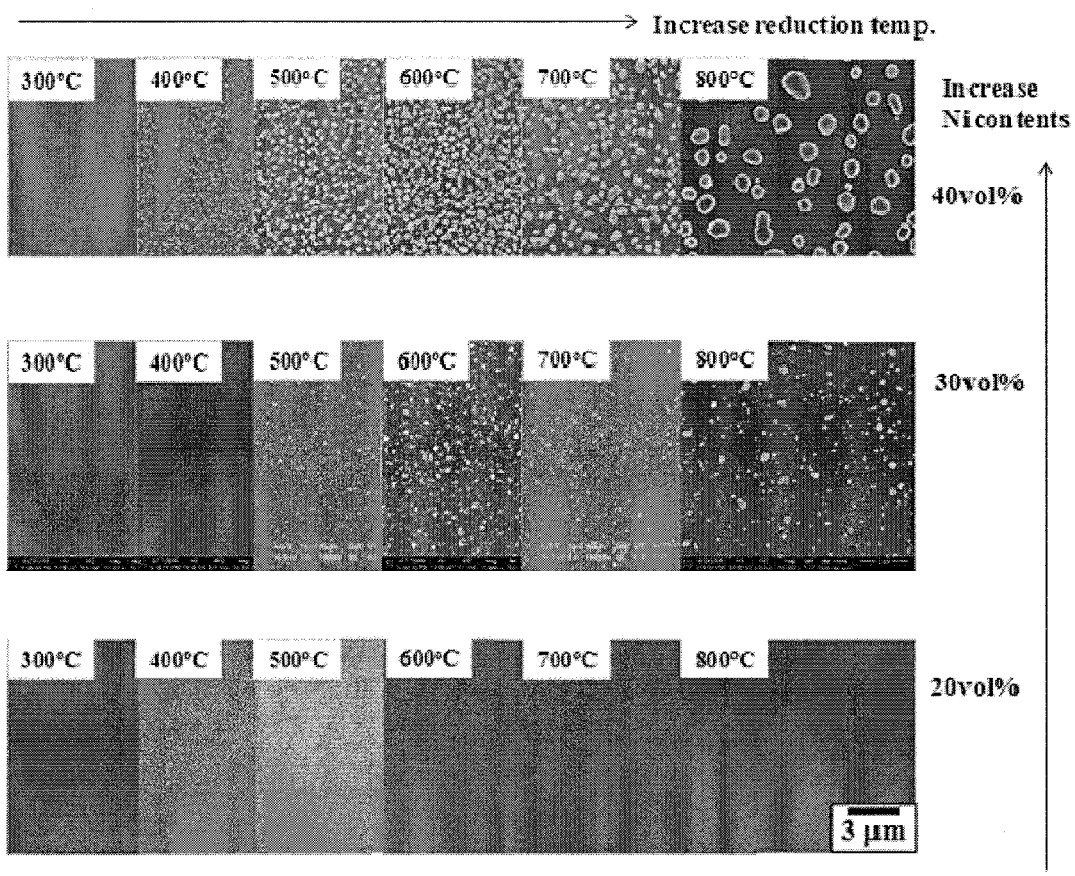
FIG. 5 is a collection of scanning electron microscopy (SEM) micrographs showing change in a microstructure of the NiO—YSZ thin film according to an Ni content and a reduction temperature after the NiO—YSZ thin film was deposited by a PLD method while a substrate temperature was maintained at 700° C. and a post-annealing process was not performed thereon.

For example, the inventors of the present invention of this application intended to form an NiO—YSZ (Ni 40 vol. % after reduction) thin film by using pulsed-laser deposition (PLD), and reduce the same to obtain a nano-porous structure. NiO of the NiO—YSZ thin film was reduced to Ni and it can be obtained a nano-porous structure and electric conductivity in the thin film. However, as shown in FIG. 4, when the NiO was reduced to Ni, Ni agglomerated severely. The reason was determined that YSZ and Ni, having a few nano-size, has very high activity to intensively increase driving force of Ni agglomeration, and YSZ does not have sufficient strength to restrain agglomeration of Ni. In addition, as shown in FIG. 5, although the temperature of reduction and the content of Ni were changed, it was difficult to prevent Ni from coarsening and a desired nano-porous structure failed to be obtained. A thin film, in which coarsening of Ni did not appear, did not have electric conductivity.

Figure 6:
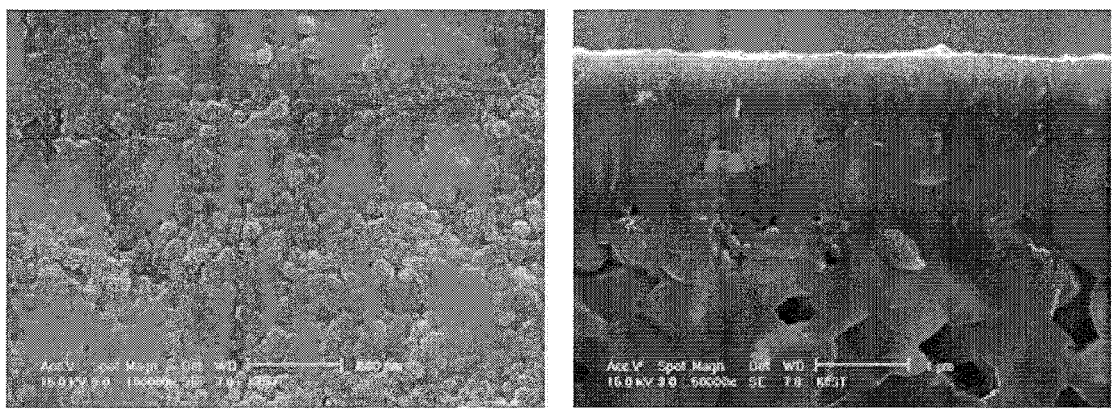
FIG. 6 is a view showing a microstructure of the NiO—YSZ thin film after the NiO—YSZ thin film was deposited according to the PLD method by using an anode support as a substrate while a substrate temperature was maintained at 700° C., and then post-annealed at 1000° C. for 1 hour.
Figure 7:
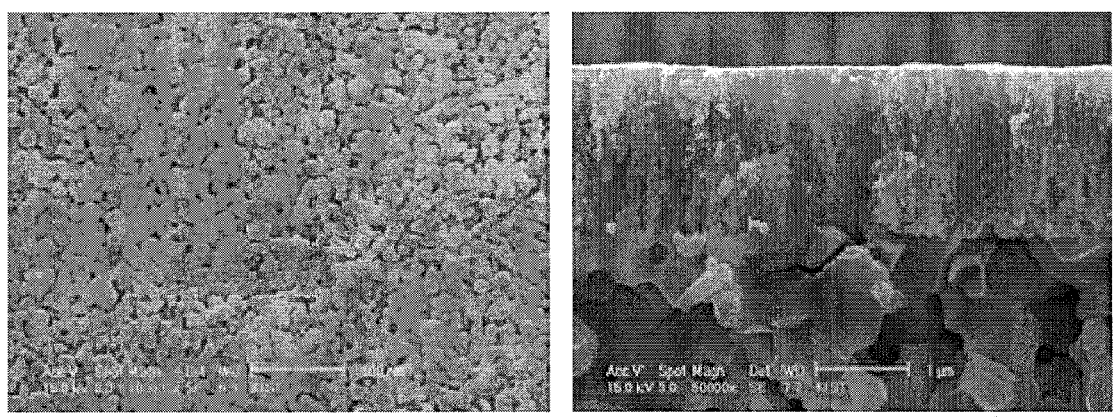
FIG. 7 is a view showing a microstructure obtained after a test sample having the microstructure shown in FIG. 6 was reduced for five hours at 600° C.

Thus, the inventors of the present invention performed post-annealing treatment in order to reduce the coarsening driving force and increase the connectivity and strength of the YSZ. FIG. 6 shows a microstructure obtained after depositing the NiO—YSZ through PLD method and then post-annealing it at 1000° C., and FIG. 7 shows a microstructure obtained after post-annealing the NiO—YSZ thin film and then reducing it at 600° C. five hours. As shown in FIG. 7, unlike the microstructure shown in FIG. 4, when the NiO—YSZ was post-annealed and then reduced, coarsening of Ni did not occur. Also, although the thin film was formed through vacuum deposition, it has an isotropic microstructure, rather than a columnar structure. That was newly discovered by the inventors of the present invention, and it is determined that when a composite of two phases which are not mixed is deposited and then post-annealed, it has an isotropic structure, rather than a columnar structure.

Figure 8:
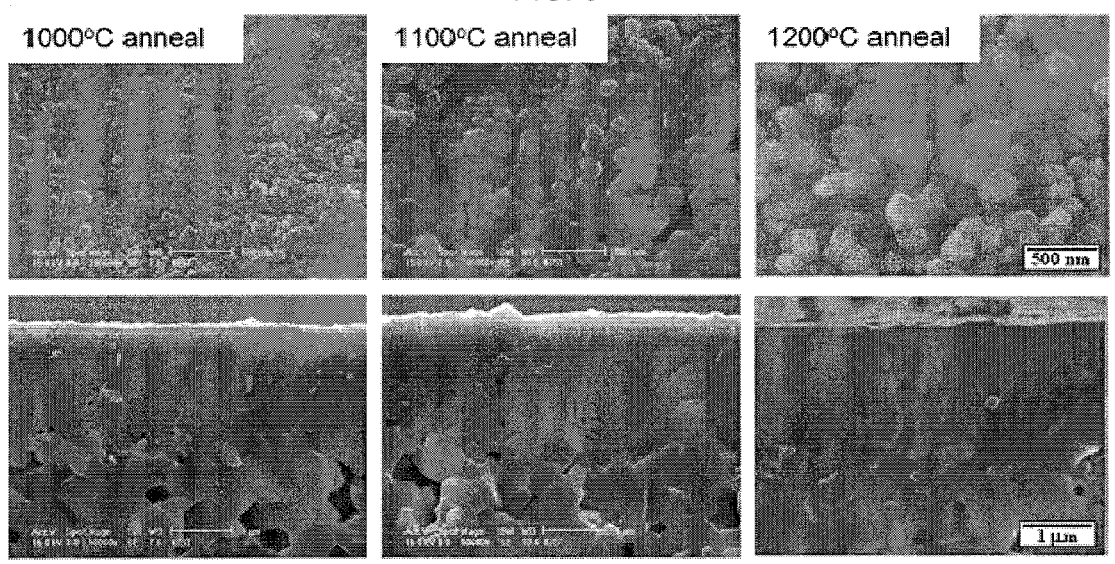
FIG. 8 is a photograph showing a change in the microstructure of the NiO-YSZ thin film according to a post-annealing temperature after the NiO—YSZ thin film was deposited according to the PLD method by using an anode support as a substrate while a substrate temperature was maintained at 700° C.

FIG. 8 shows a microstructure having a grain growth generated while changing the temperature for a post-annealing after the NiO—YSZ thin film was deposited through PLD. It was noted that the particle size was gradually increased according to an increase in the temperature of post-annealing, thereby it can be obtained a high temperature stability anode functional layer having nano-pores having a desired size.

Figure 9:
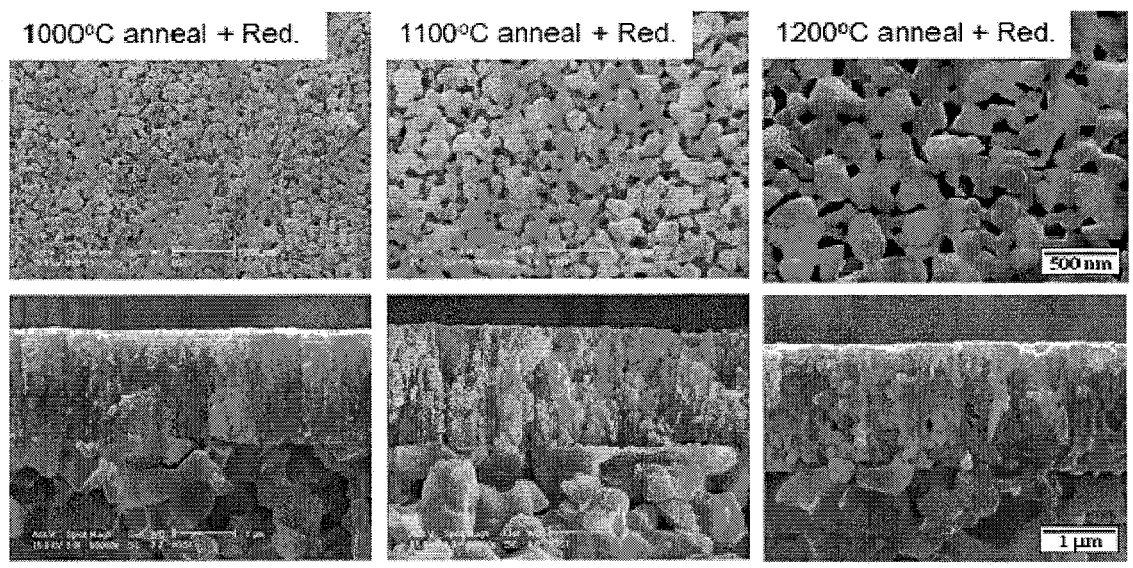
FIG. 9 is a view showing a microstructure after each test sample having the microstructure shown in FIG. 8 was reduced for five hours at 600° C.
Figure 10:
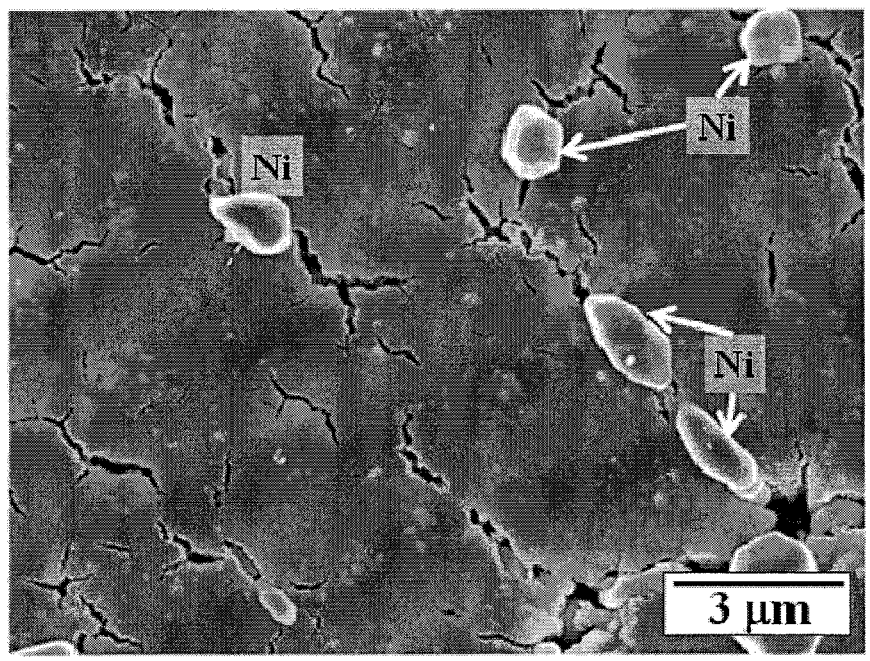
FIG. 10 is a view showing a microstructure after each test sample having the microstructure shown in FIG. 6 was reduced for ten hours at 800° C.

FIG. 9 is a view showing a microstructure after each test sample having the microstructure shown in FIG. 8 was reduced for five hours at 600° C. FIG. 10 shows a microstructure obtained after post-annealing the NiO—YSZ thin film, which was vacuum-deposited on the anode support, at 1000° C. and then reducing the same at 800° C. for 10 hours. The microstructure of FIG. 10, which was formed higher reduction temperature and more reduction time than those of conditions making sample at the far left in FIG. 9, was observed coarsening Ni.

From these results, it was confirmed that if the strength of the ceramic skeleton is not sufficiently strong through post-annealing, metal agglomerates when the reduction temperature is increased or the reduction time is increased. Namely, in order to prevent metal from coarsening and in order for the ceramic-metal nano-composite to have structural stability in a relatively severe environment (e.g., a high reduction and operation temperature, a long-time reduction), post-annealing treatment is required to be performed to allow the ceramic skeleton to have sufficient strength.

Also, when the temperature of the post-annealing treatment is 1000° C. as relatively low temperature, the grain growth is slow, and it can be obtained electrolyte layer having finer structure. But in this case, the reduction temperature, and the reduction time may be limited and an operation temperature of the SOFC may be restricted to a low temperature as 600° C. or lower. Namely, within the range satisfying such restriction conditions, the temperature of post-annealing treatment, temperature of the reduction and operation temperature may be adjusted to obtain the degree of freedom of the nano-porous structure. In this point of view, the post-annealing treatment may be performed at 1000° C. to 1300° C., preferably, 1100° C. to 1300° C. When the post-annealing treatment is performed at temperature higher than 1300° C., grain growth may be 500 nm or greater, and accordingly, the size of pores can be increased, so difficulty to form an electrolyte layer of 1 micron or smaller at the upper portion is expected.

Also, when the heat treatment is performed at 1200° C. or higher, although reduction is performed at 400° C. to 800° C., the structure of the nano-composite is expected to be stable, and when the heat treatment is performed at temperature of 1100° C. or lower, even when a reduction temperature ranges from 400° C. to 650° C., the structure of the nano-composite is expected to be stable.

The results of vacuum-depositing the anode functional layer by using pulsed-laser deposition (PLD) have been described above, and at the step (a), it can be used the PLD, for example, chemical vapor deposition (CVD), or physical vapor deposition (PVD) such as e-beam evaporation, thermal evaporation, sputtering, or the like.

Also, the first method for fabricating an SOFC according to the present invention may further comprising: applying a composite nano-powder slurry, in which ceramic nano-powders for an electrolyte and nano-powders of a metal oxide are dispersed, on a porous anode support 11 to form a thin film, drying the thin film and sintering the same before the step (a) for having a nano-porous anode functional layer with a two-step gradient structure in the anode-supported solid oxide fuel cell.

In this case, the SOFC according to an embodiment of the present invention further includes the porous-intermediate layer 15 having a pore size, which is between the pore size of the porous anode support 11 and the pore size of the nano-porous anode functional layer 13, and located between the porous anode support 11 and the nano-porous anode functional layer 13, thus facilitating the transport of a fuel gas to further improve the performance and reliability of the thin film fuel cell.

In step (c), the electrolyte layer may be formed through vacuum deposition such as chemical vapor deposition (CVD), pulsed-laser deposition (PLD) or physical vapor deposition (PVD) such as e-beam evaporation, thermal evaporation, sputtering, or the like. Also, the electrolyte layer may be formed by applying an electrolyte salt solution in which an electrolyte oxide precursor is dissolved through a spray method such as electrostatic spray deposition (ESD), pressurized spray deposition (PSD), or spray pyrolysis, or the like, spin coating, or dipping, and then sintering (thermally treating) the same.

The first method for fabricating an SOFC according to an embodiment of the present invention may further is comprising, completing a unit cell structure by forming a cathode at an upper portion of the electrolyte layer, after step (c).

A second method for fabricating an SOFC according to an embodiment of the present invention is comprising (a) forming a coated film of a ceramic and a metal oxide on a porous anode support by applying a composite nano-powder slurry, in which ceramic nano-powders for an electrolyte and nano-powders of a metal oxide are dispersed, and drying the same, (b) sintering the coated film, and (c) forming an electrolyte layer on the coated film.

The porous anode support is fabricated through a conventional powder process, and it has pores having a size of a few microns.

In step (a), a coated film of a composite nano-powder slurry, in which ceramic nano-powder for electrolyte and metal oxide nano-powder for electrolyte are evenly dispersed, is formed on the porous anode support, and then dried. When the coated film is sintered and subjected to a reduction process, a nano-porous layer having pores having a size of tens to hundreds of nano-meters is formed.

The composite nano-powder slurry is a dispersed solution or a colloidal solution in which a ceramic for electrolyte, e.g., nano-powder of YSZ or GDC, and a metal oxide for electrode, e.g., nano-powder of NiO, are uniformly dispersed in a solvent such as alcohol, e.g., ethanol, acetylacetone, or the like.

When the anode functional layer is fabricated by using the related art bulk process, slurry is produced by using powder obtained by mechanically mixing YSZ and NiO, and applied to the anode support by using screen printing. However, the powder obtained by the mechanical mixing has a problem in that YSZ and NiO are separated due to the difference between the density of the YSZ (5.6 to 6.0 g/cm$^3$) and the density of the NiO (7.4 g/cm$^3$).

Thus, in an embodiment of the present invention, in order to improve the degree of dispersion of the composite nano-powder with the metal oxide for electrode and the ceramic for electrolyte, and to synthesize multi-component material (e.g., NiO and YSZ), synthesizing an ion conductive ceramic (e.g., YSZ) for electrolyte and the metal oxide (e.g., NiO) for electrode through spontaneous combustion synthesis, or a glycine-nitrate process (GNP) using an oxidizing agent and fuel (e.g., glycine) is preferable for fabricating the composite powder.

A size of the composite nano-powder is tens to hundreds nano-meter, the composite nano-powder has a large surface area and high energy, so it tends to agglomerate. Thus, it is important to uniformly disperse the composite nano-powder in the solvent. In an embodiment of the present invention, polymer such as polyvinylbutyral (PVB), polyvinylpyrrolidone (PVP), or the like, is used to achieve an excellent dispersion.

The composite nano-powder slurry may be applied through one or more selected from the group consisting of a spray method, spin coating, and dipping, where in the spray method so any one selected from a group of electrostatic spray deposition (ESD), pressurized spray deposition (PSD), and spray pyrolysis, The ceramic for electrolyte may be one or more selected from the group consisting of yttria stabilized zirconia (YSZ), scandia stabilized zirconia (ScSZ), gadolinia doped ceria (GDC), samarium doped ceria (SDC), strontium manganese doped lanthanum gallate (LSGM), and silver yttria doped bismuth (YDB) oxide, and the metal oxide for electrode may be an oxide of metal selected from the group consisting of nickel (Ni), ruthenium (Ru), palladium (Pd), rhodium (Rd), platinum (Pt), and an alloy thereof.

In step (b), the coated film of the composite nano-powder slurry is sintered. Through sintering, the ceramic is connected to each other to form a skeleton as a structural support. In this case, the coated film is sintered at a proper temperature, e.g., 1000° C. to 1300° C. so that the ceramic skeleton can have sufficient strength, and accordingly, the metal is prevented from agglomeration or coarsening in a follow-up reduction process.

In step (c), the electrolyte layer may be formed through vacuum deposition such as chemical vapor deposition (CVD), or physical vapor deposition (PVD) such as e-beam evaporation, thermal evaporation, sputtering, or the like. Here, when the electrolyte layer is formed by the vacuum deposition, an additional sol spin process may be required to be performed on an upper portion of the electrolyte layer in order to prevent a formation of a micro-pin hole due to the columnar structure.

In step (c), a salt solution for electrolyte, in which one or more types of metal oxide precursors are dissolved, may be prepared and applied to the composite nano-powder slurry coated film through a spray method such as electrostatic spray deposition (ESD), pressurized spray deposition (PSD), or spray pyrolysis, or the like, spin coating, or dipping, which is then sintered (thermally treated) to form the electrolyte layer. A detailed procedure thereof is described in Korean Patent Application No. 2008-100491.

The second method for fabricating an SOFC according to an embodiment of the present invention may be further comprising forming a cathode at an upper portion of the electrolyte layer to complete a unit cell structure and reducing the anode, after step (c). A nano-porous layer, obtained through the reduction finally, can include a cermet composite of the ceramic for electrolyte and the metal generated by reducing the metal oxide for electrode.

According to an embodiment of the present invention, the nano-porous layer may have a mono-layered structure or a multi-layered structure (including, e.g., two or more layers) in which the size of pores diminishes by layer toward the electrolyte layer. When the nano-porous layer has a multi-layered structure, the size of pores can be adjusted by adjusting a sintering temperature and the size, amount, or the like, of the metal oxide nano-powder.

The porous anode support may have a mono-layered structure or a multi-layered structure (including, e.g., two or more layers) in which the size of pores diminishes by layer toward the nano-porous layer, thus sequentially reducing the size of pores.

In this manner, in the SOFC according to an embodiment of the present invention, the size of pores and the surface roughness diminish from the porous anode support toward upper layers, wherein a size of the pores in the porous anode support is a few to tens microns and surface roughness, and finally, the size of pores and the surface roughness are controlled to be hundreds nano-meters or smaller on the upper surface of the nano-porous layer, and accordingly, the dense electrolyte layer of two microns or smaller, preferably, one micron or smaller can be formed on the upper portion of the nano-porous layer.

Figure 11:
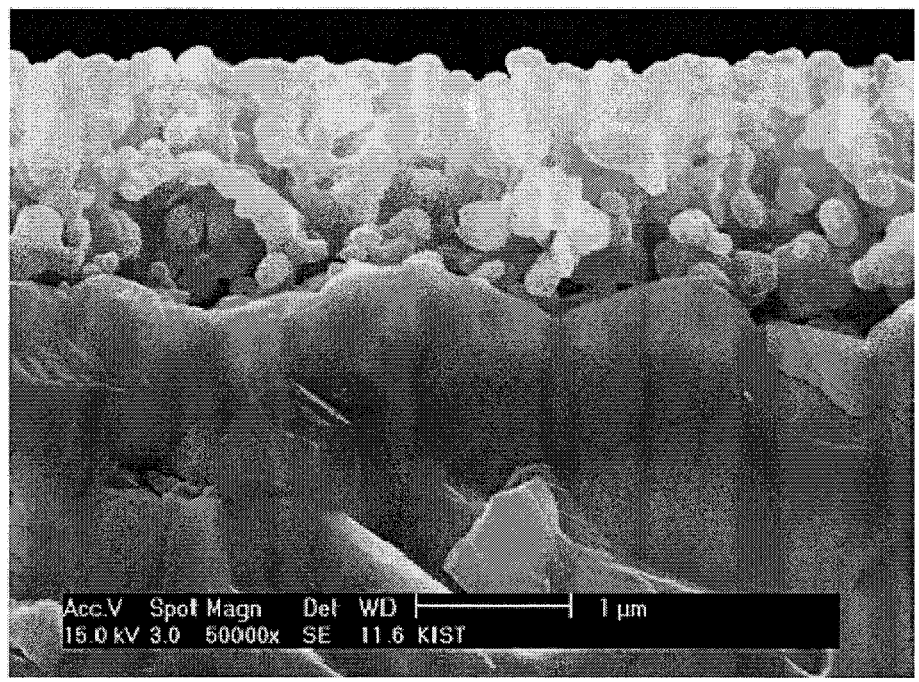
FIG. 11 is a SEM micrograph of a cross-section of a test sample obtained by applying composite nano-powder slurry on an anode support having a two-step gradient structure and sintering it.

In particular, since the ceramic and metal oxide nano-powder within the composite nano-powder slurry used in step (a) fill the rough surface of the porous anode support, the upper surface of the nano-porous layer can be formed to be very smooth. FIG. 11 shows a cross-sectional microstructure of a test sample obtained by applying the composite nano-powder slurry to the porous anode support and sintering it. It is observed that the rough surface of the porous anode support is properly filled. Here, an average size of pores on the surface of the nano-porous layer in contact with the dense electrolyte layer may range 20 nm to 500 nm. Also, an average particle size of the nano-porous layer may range from 20 nm to 500 nm.

If the average size of the pores is smaller than 20 nm, transport of gas such as fuel, an oxidizing agent, or the like, is not enough, and if the average size of pores exceeds 500 nm, it is difficult to form the electrolyte layer of two microns or smaller, preferably, one micron or smaller, and even if the electrolyte layer is formed, thermal, mechanical vulnerability cannot be avoided in the operation of the fuel cell later. In this powder size range (20-500 nm), since the resistance to shrinkage force is high due to the nano-size of the ceramic and metal oxide powder within the composite nano-powder slurry and the interface adhesion strength with the dense electrolyte layer is improved, a problem of shrinkage mismatching with the electrolyte layer 20 formed thereon does not arise.

EXAMPLES

The present invention will now be described in detail through examples. However, the examples are merely illustrative and the scope of the present invention is not limited thereto.

Example 1

Fabrication of SOFC including porous anode support fabricated through powder process and a porous anode functional layer formed on the porous anode support through vacuum deposition (two-step anode pore-gradient structure)

An NiO—YSZ tape fabricated by using a powder process is laminated and then sintered at 1300° C. for four hours to fabricate a porous anode support.

Thereafter, the temperature of the anode support was fixed to 700° C., and an NiO—YSZ target was deposited to have a thickness of about two microns on the anode support at 50 mtorr of oxygen process pressure through pulsed laser deposition (PLD).

Figure 12:
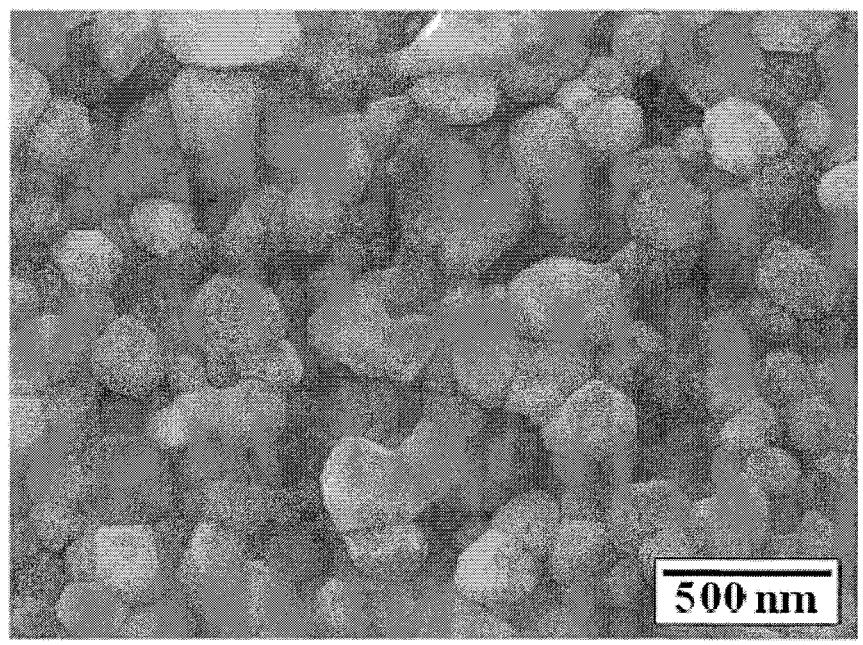
FIG. 12 is a microstructure of the surface of the NiO—YSZ thin film after the NiO—YSZ thin film was vacuum-deposited according to the PLD method and then post-annealed according to Example 1 of the present invention.
Figure 13:
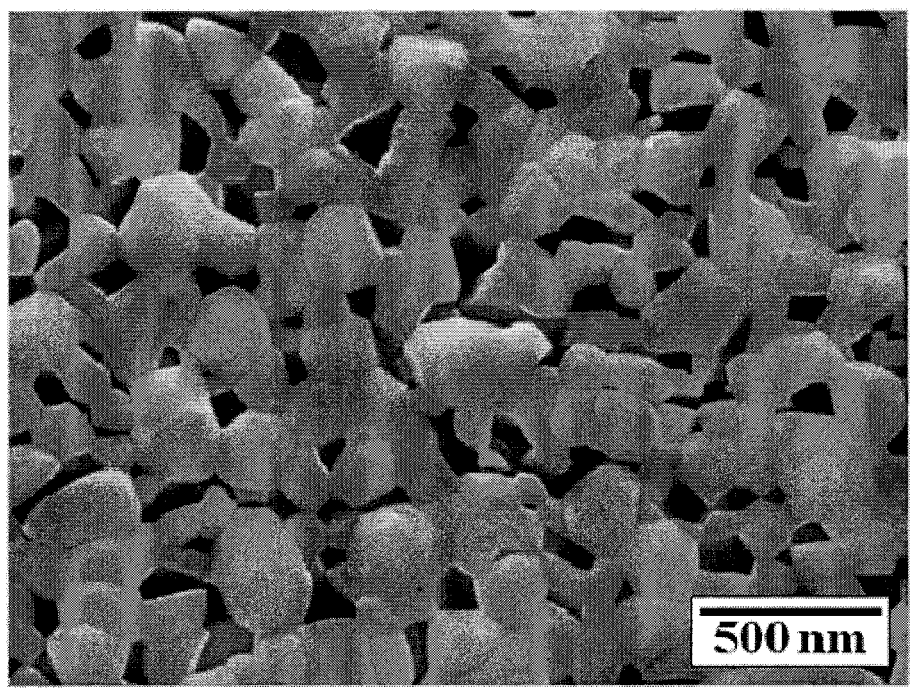
FIG. 13 is a microstructure of the surface of the NiO—YSZ thin film after the NiO—YSZ thin film was vacuum-deposited according to the PLD method, post-annealed, and then reduced according to Example 1 of the present invention.

Thereafter, the deposited NiO—YSZ thin film was post-annealed at 1200° C. The post-annealing treatment could strengthen bonding force between YSZs to prevent Ni metal from coarsening during reduction. In this process, the particle size was grown from few nm (approximately 2 nm to 3 nm) at the initial stage to a 100 nm level. FIG. 12 shows a microstructure of the surface of the post-annealed NiO—YSZ thin film, and FIG. 13 shows a microstructure of the surface of the post-annealed NiO—YSZ thin film after reduction. In FIG. 13, it is shown that very small pores of a 100 nm level are uniformly formed on the surface of the NiO—YSZ after reduction. In actuality, in the SOFC fabrication process, the NiO—YSZ thin film is deposited through PLD and electrolyte is formed on the thin film, and thereafter, a reduction process is performed, but here, in order to observe the surface of the anode functional layer after reduction, the reduction process is performed before forming electrolyte, and the results are shown in FIG. 13.

Figure 14:
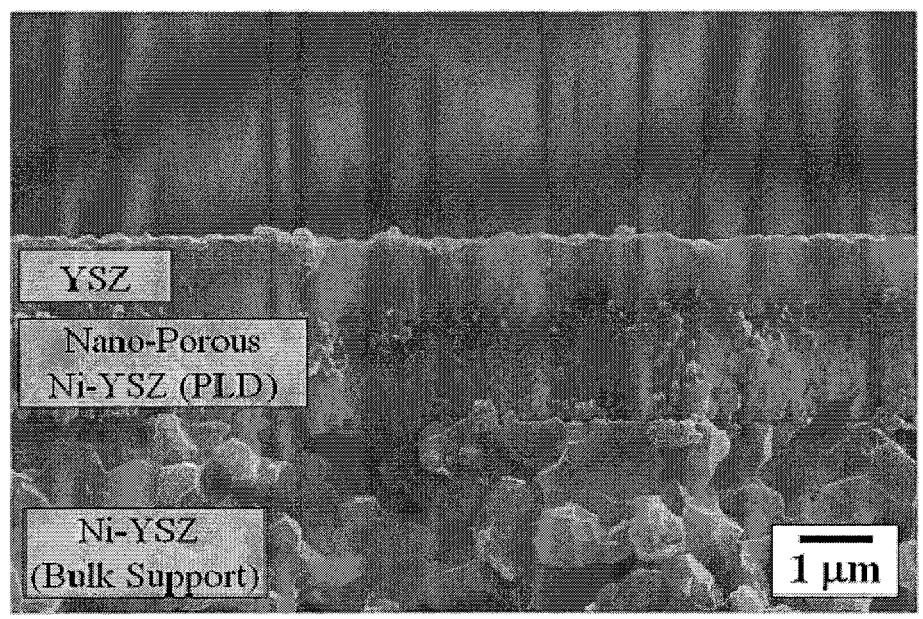
FIG. 14 is a SEM micrograph showing the cross-section of a porous anode support, a nano-porous anode functional layer, and an electrolyte layer after the NiO—YSZ thin film was deposited according to the PLD method, and an YSZ electrolyte layer was formed to have a thickness of 1 micron on the NiO—YSZ thin film, and then reduced according to Example 1 of the present invention.
Figure 15:
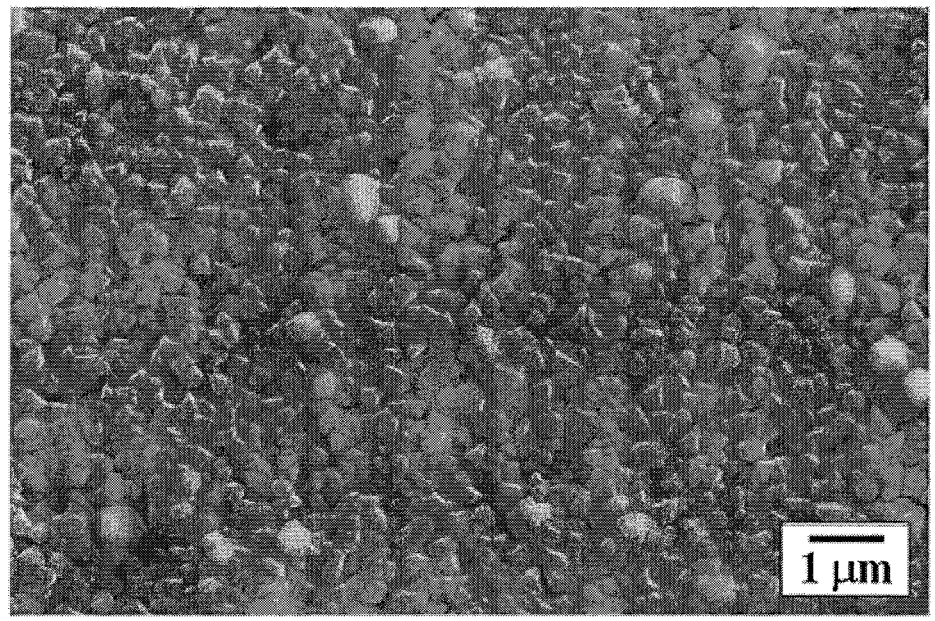
FIG. 15 is a surface microstructure of the electrolyte layer after the NiO-YSZ thin film was deposited according to the PLD method and post-annealed, and an YSZ electrolyte layer was formed to have a thickness of 1 micron on the NiO-YSZ thin film, and then reduced according to Example 1 of the present invention.

FIGS. 14 and 15 are photographs showing the cross-section (FIG. 14) and the surface (FIG. 15) of the structure after the NiO—YSZ thin film was deposited according to the PLD method, and an YSZ electrolyte layer was formed to have a thickness of 1 micron on the NiO—YSZ thin film, and then reduced. In FIG. 14, it is shown that the pore-gradient structure, in which the size of pores of the anode functional layer is gradually reduced by layer toward upper layers, is properly formed, and the upper electrolyte layer is densely maintained without damage such as a rupture, a generation of a crack, or the like, and in FIG. 15, it is shown that the electrolyte layer having a thickness of one micron is densely formed.

Figure 16:
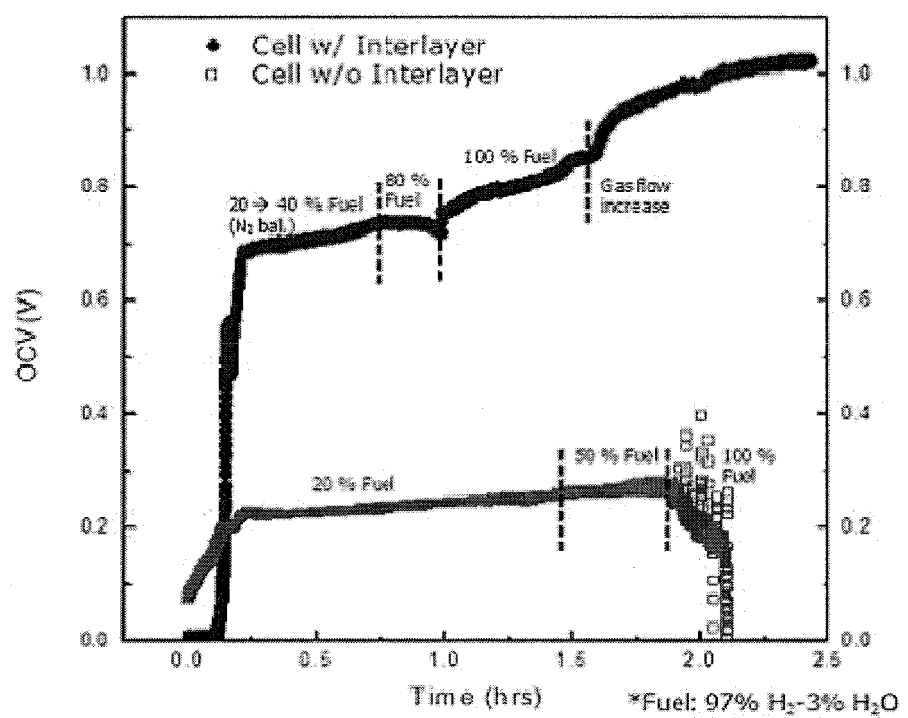
FIG. 16 is a graph showing the comparison of an OCV manifestation between an SOFC according to Example 1 of the present invention and an SOFC (Comparative Example 1) fabricated by using an electrolyte layer without a nano-porous anode functional layer (FL).
Figure 17:
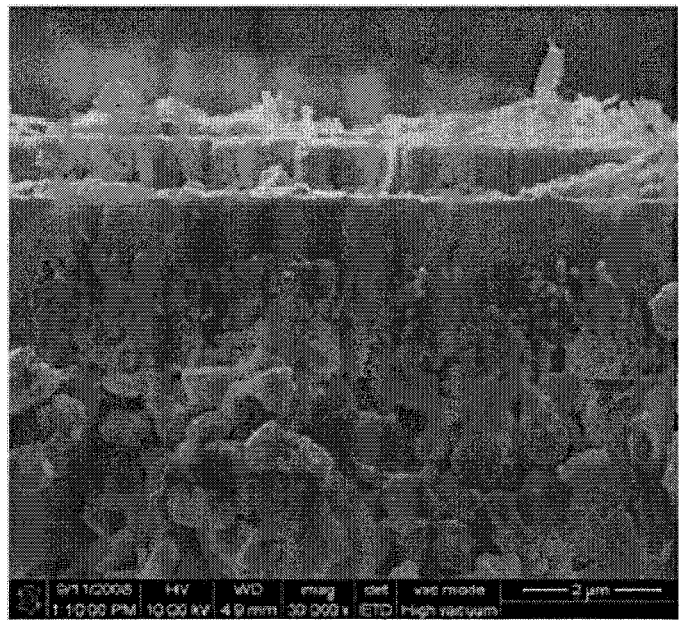
FIG. 17 is a view showing a cross-sectional microstructure of the unit cell after the OCV of the SOFC according to Example 1 of the present invention was measured.
Figure 18:
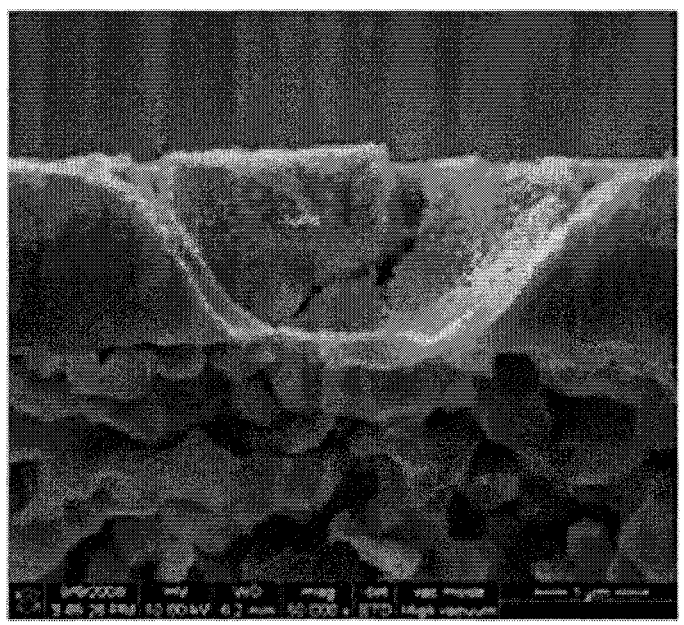
FIG. 18 is a cross-sectional microstructure of the unit cell after the OCV of the SOFC according to Comparative Example 1 was measured.

The SOFC (Example 1) using the structure as shown in FIGS. 14 and 15 and the SOFC (Comparative Example 1) using the electrolyte layer without a nano-porous anode interlayer were fabricated, respectively, and an open circuit voltage (OCV) was measured, and the results are shown in FIG. 16. In FIG. 16, it is noted that an OCV value exceeding 1V was measured in the SOFC according to Example 1 of the'present invention, and in the SOFC according to Comparative Example 1, the electrolyte layer was broken, so the OCV cannot be measured. FIG. 17 shows a cross-sectional microstructure of the unit cell after measuring the OCV of the SOFC according to Example 1 of the present invention and FIG. 18 shows a cross-sectional microstructure of the unit cell after measuring the OCV of the SOFC according to Comparative Example 1. As shown in FIG. 18, large amount of defect (electrolyte damage) is generated in the SOFC according to Comparative Example 1, failing to implement a thin-film electrolyte layer.

Example 2

Fabrication of thin film SOFC including anode functional layer formed through vacuum deposition on a porous-anode support having a two-step gradient structure fabricated through powder process (three-step anode pore-gradient structure) and the evaluation of performance A layer having a small size of pores, which is compared with a layer formed by pressing NiO—YSZ composite powder, pre-sintering it and forming it through common powder process, was formed through screen printing and sintered at 1400° C. for three hours to fabricate a porous anode support having a two-step porous gradient structure.

And then, the temperature of the anode support having the two-step pore-gradient structure was fixed at 700° C., and an NiO—YSZ thin film was deposited on the NiO—YSZ thin film to have a thickness of about 4 to 6 microns through pulsed laser deposition (PLD) by using the NiO—YSZ target at an oxygen process pressure of 50 mtorr and then post-annealed at 1200° C.

And then, the temperature of the anode support having the two-step pore-gradient structure with the post-annealed NiO—YSZ thin film formed thereon was fixed at 700° C., and a YSZ thin film was deposited to have a thickness of 1 micron or smaller through pulsed laser deposition at an oxygen process pressure of 50 mtorr to form an electrolyte layer. And then, the temperature was fixed at 700° C., a GDC was deposited, as a reaction buffer layer, to have a thickness of 200 nm at an oxygen process pressure of 50 mtorr through pulsed laser deposition. Thereafter, an LSC was deposited, as a cathode, to have a thickness of 1 micron through pulsed laser deposition at an oxygen process pressure of 100 mtorr at room temperature and post-annealed at 650° C. to make an SOFC unit cell.

Figure 19:
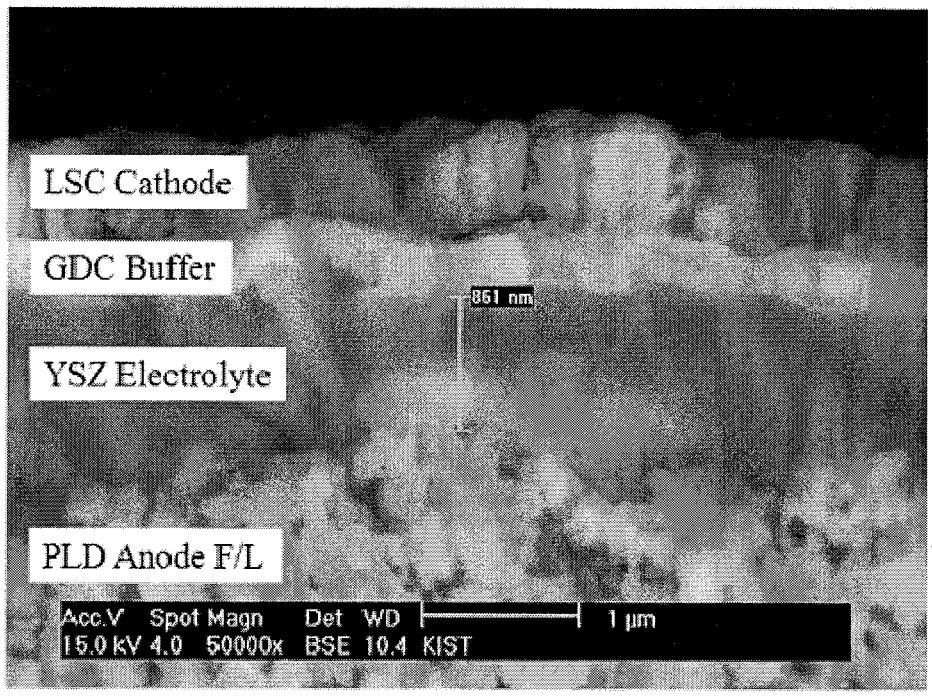
FIG. 19 is a view showing a cross-sectional microstructure of the unit cell after the performance of the cell of the SOFC according to Example 2 of the present invention was measured.

FIG. 19 is a photograph of the cross-section of the unit cell after testing a unit cell output performance. Since the anode support was not subjected to a planarization process, it is observed that unit cell components show slight undulation and the electrolyte layer of 1 micron or smaller is formed on the nano-porous anode functional layer.

Figure 20:
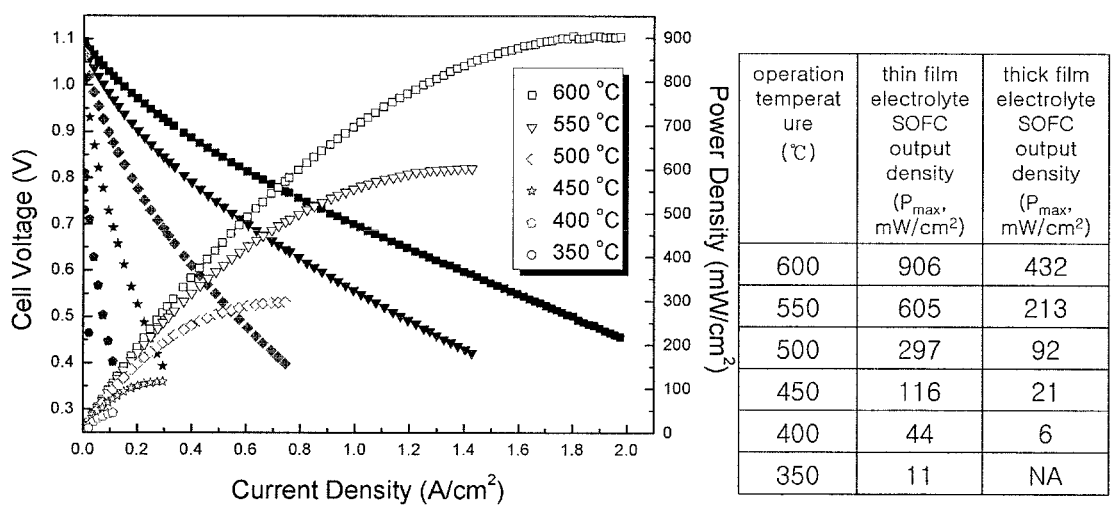
FIG. 20 is a view showing the results of comparing output density performance of the SOFC according to Example 2 of the present invention and that of a thick film electrolyte SOFC, wherein the left graph shows an I-V-P curve by temperature showing a thin film electrolyte output density and the right table shows output density (thin film electrolyte unit cell) read from the graph and output density data of thick film electrolyte unit cell which was separately measured.
Figure 21:
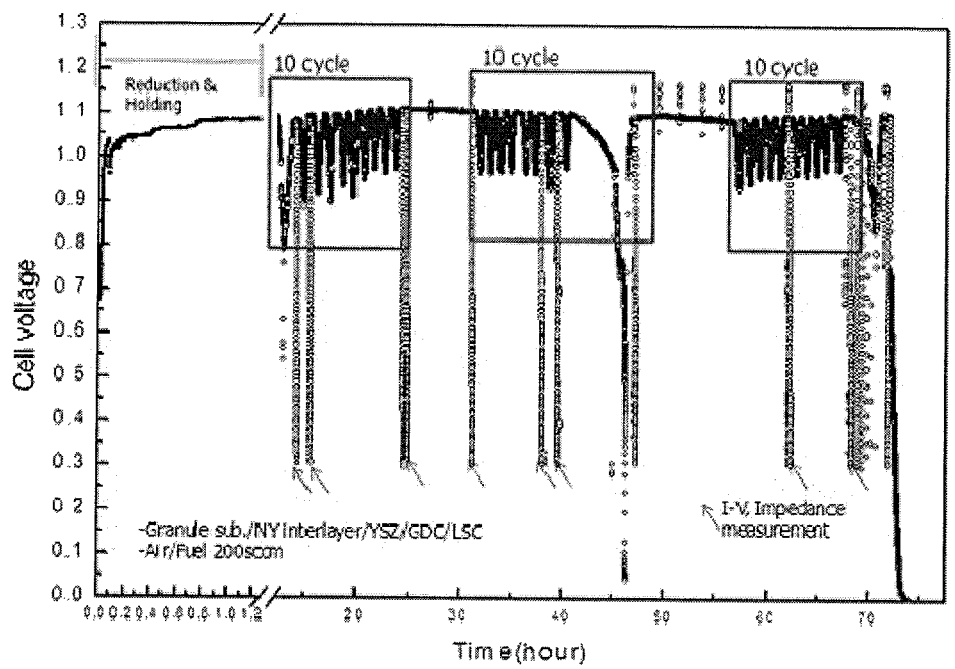
FIG. 21 is a graph showing the results of measurement of thermal cycle characteristics of the SOFC according to Example 2 of the present invention conducted 30 times.

FIGS. 20 and 21 show output performance of the unit cell fabricated through the foregoing method and heat cycle characteristics at 350° C. to 600° C. FIG. 20 shows that the SOFC unit cell according to the embodiment of the present invention has superior output performance at low temperature compared with an unit cell which has electrolyte having a thickness of about 8 microns and including the same anode support and cathode but without the anode functional layer, and FIG. 21 shows that the output performance such as OCV, or the like, of the SOFC unit cell according to the embodiment of the present invention is recovered even after a heat cycle of 30 times or greater. Such an improvement of the thermo-mechanical stability has not been reported in the SOFC having thin film electrolyte of 1 micron or smaller.

Example 3

Fabrication of thin film SOFC including anode functional layer formed through a composite nano-powder slurry spin coating method on a porous-anode support having a two-step gradient structure fabricated through powder process, and an additional anode functional layer formed on the anode functional layer through vacuum deposition (four-step anode pore-gradient structure) and the evaluation of performance A porous anode support having a two-step pore-gradient structure was fabricated by using the same method as that of Example 2.

Composite nano-powder used for fabricating composite nano-powder slurry in which ceramics for electrolyte and metal oxide nano-powder for electrode are dispersed was fabricated in the following manner.

As a material of NiO, $Y_2O_3$ and $ZrO_2$, $Ni(NO_3)_2 \cdot 6H_2O$ (JUNSEI Co. product), $Y(NO_3)_3 \cdot 6H_2O$ (ALDRICH Co. product), and $N_2O_7Zr.XH_2O$ (ACROS Co. product) was used as an oxidizing agent of glycine-nitrate process (GNP), and glycine ($H_2NCH_2COOH$) (DAEJUNG CHEMICAL Co. product) was used as fuel. A weight ratio of NiO/YSZ was adjusted to be 56/44, and YSZ was controlled to become zirconia employing $Y_2O_3$ by 8 mol %. After distilled water 1500 ml was put into 3000 ml beaker, the oxidizing agent was sequentially dissolved and continuously stirred, and the state was checked. The amount of metal nitrate was adjusted to obtain Ni/YSZ powder at such a ratio that the content of Ni after reduction was 40 vol %, divided it and put into a 500 ml beaker, and heated at 400° C. so as to be spontaneously burnt. When the distilled water was completely removed, glycine coupled with the metal nitrate was spontaneously burnt to generate $N_2$, $CO_2$, and $H_2O$, and at this time, very high heat was generated to form a metal oxide. In order to remove carbon or nitrate remaining in the product after the reaction was finished, the product was dry-milled for six hours and calcined at 600° C. for five hours. In order to make the calcined powder nano-size particles, the calcined powder was milled by Super Apex Milling (UAM-015) at 4975 rpm for 20 minutes to reduce an average particle size to about 200 nm, and in order to improve the degree of dispersion of powder, 5 wt % of PVP (10,000 molecular weight) was added to the powder.

Figure 22:
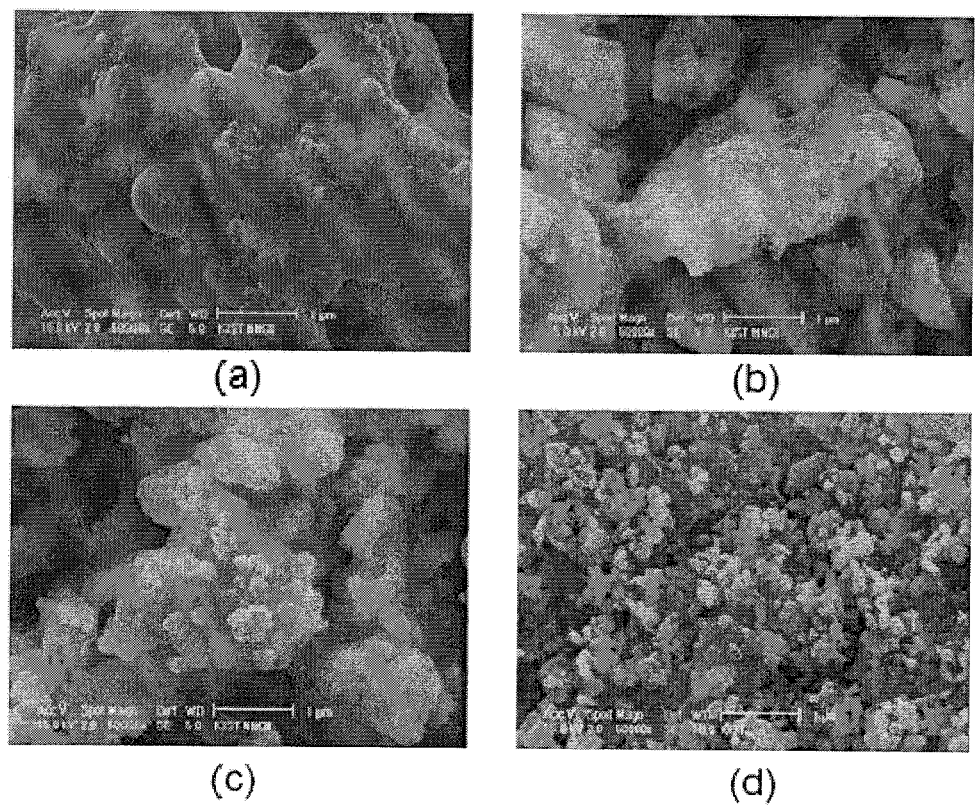
FIG. 22 is a SEM micrograph of each step of the process of fabricating composite nano-powder of NiO and YSZ according to Example 3 of the present invention (a: an image obtained immediately after synthesizing according to a GNP method, b: an image obtained after dry-milling for six hours, c: an image obtained after calcining for five hours at 600° C., and d: an image obtained after milling two minutes with a high energy mill).

FIG. 22(a) to (d) show an SEM micrograph at each step of the process of fabricating the metal oxide nano-powder. FIG. 22(a) shows an image of composite nano-powder immediately after synthesizing through a GNP method, FIG. 22(b) shows an image of composite nano-powder after performing dry milling for six hours, FIG. 22(c) shows an image of composite nano-powder after calcination at 600° C. for five hours, and FIG. 22(d) shows an image of composite nano-powder after performing milling by a high energy mill (super apex milling) for 20 minutes.

The NiO—YSZ composite nano-powder obtained through the foregoing method was mixed by 5 vol % to an ethanol: acetylacetone mixture having a volume ratio of 1:1 to fabricate composite nano-powder slurry, and in order to provide viscosity to the slurry, polyvinylbutyral B29 (PVB, molecular weight=50,000-80,000) corresponding to 10 wt % was added to a total weight of the slurry to finally complete the composite nano-powder slurry. Before being applied to a substrate, the composite nano-powder slurry was ultrasonicated for one hour so as to be additionally dispersed uniformly.

The fabricated NiO—YSZ composite nano-powder slurry was applied to the porous anode support through spin coating. After the NiO—YSZ composite nano-powder slurry was applied, it was dried at 200° C. for two yours and then sintered at 1200° C. for two hours to form a nano-porous anode functional layer. FIGS. 23(a) and 23(b) shows a cross-section and a surface microstructure of the sintered body including the first nano-porous anode functional layer. The thickness of the spin layer was 2 microns through single coating, and the thickness of the spin layer was adjusted to be within the range of 2 microns to 4 microns. The coating time was 50 seconds and the rotation speed was 2500 rpm.

Next, an additional nano-porous anode functional layer was formed to have a thickness of about 2 microns to 4 microns on the spin-coated layer through the pulsed laser deposition in the same manner as described above in Examples 1 and 2, and obtained a four-step pore-gradient structure.

An electrolyte layer, a reaction buffer layer, and a cathode were formed on the additional nano-porous anode functional layer having the four-step gradient structure according to the same method as described above in Example 2 to form an SOFC unit cell.

Figure 24:
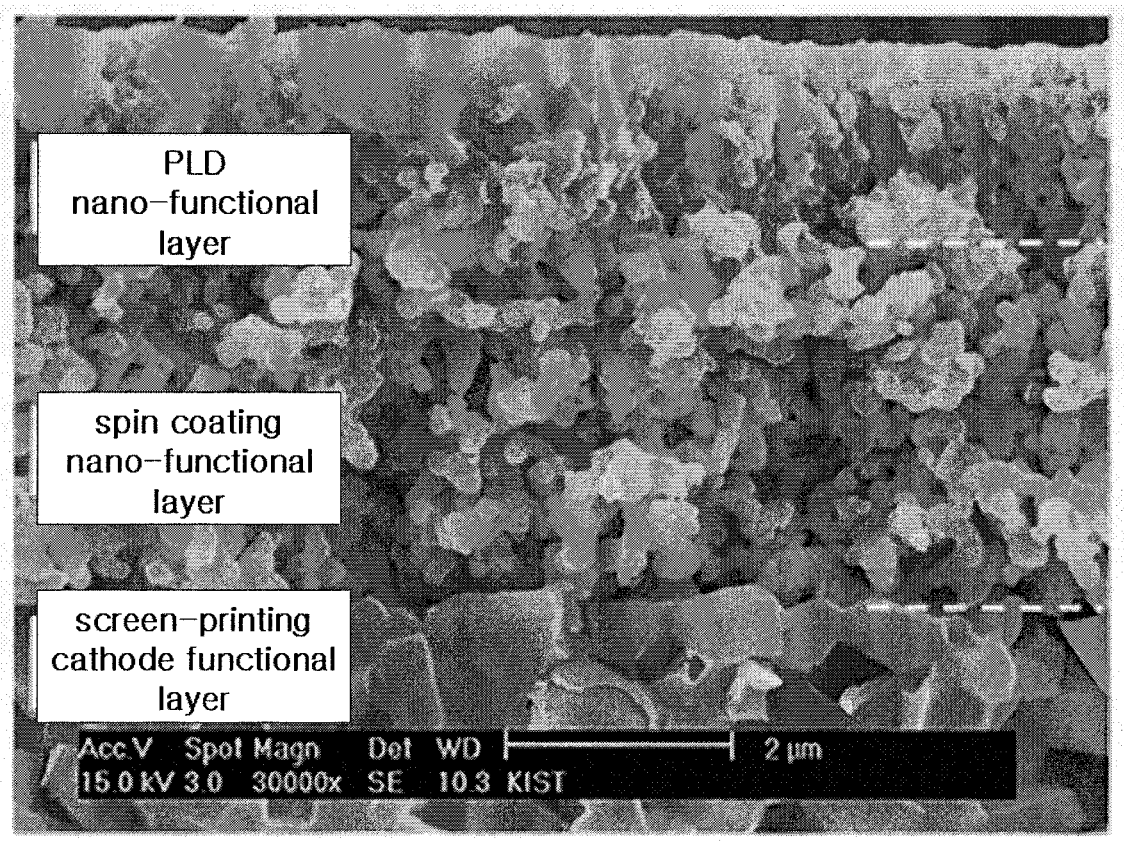
FIG. 24 is a view showing a microstructure of the section after a porous anode support having a four-step gradient structure was fabricated sequentially by using a screen printing method, a spin coating method, and a pulsed laser deposition method and then reduced according to Example 3.
Figure 25:
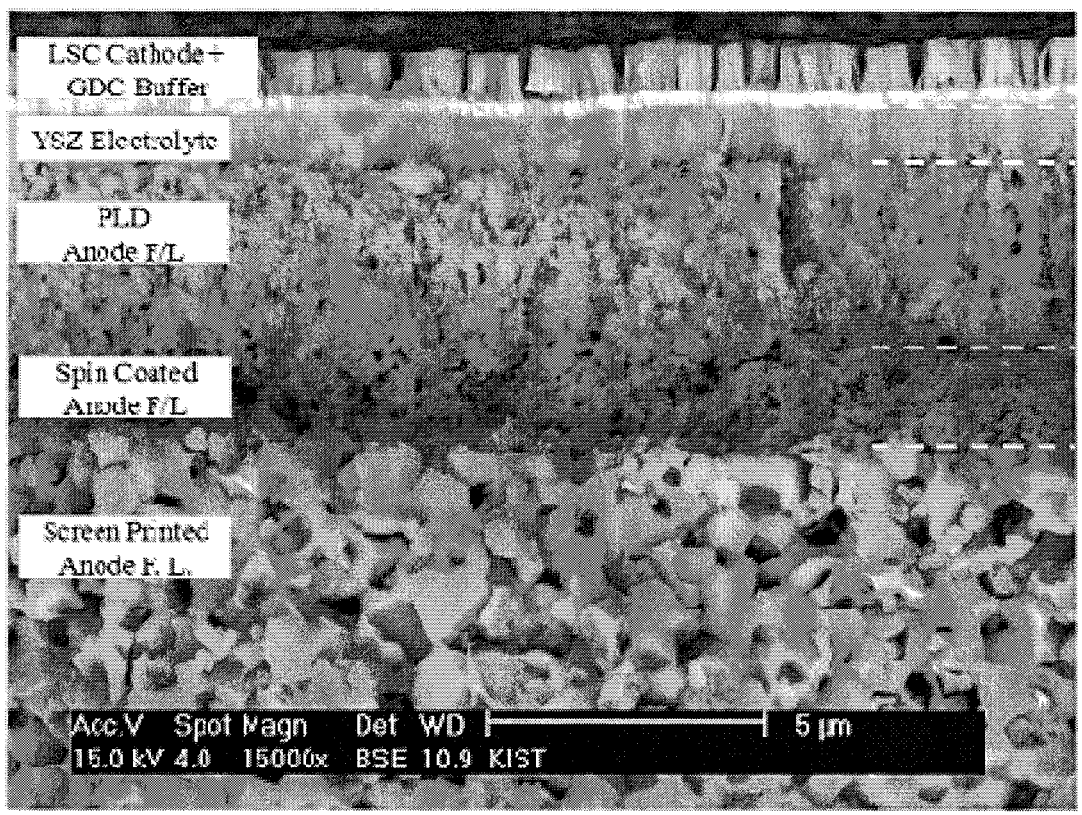
FIG. 25 is a cross-sectional microstructure after testing output performance of an unit cell after an electrolyte layer, a reaction buffer layer, and a cathode were formed on the porous anode support having a four-step gradient structure shown in FIG. 24.

FIG. 24 shows a cross-sectional microstructure obtained after reducing the porous anode having the four-step pore-gradient structure fabricated by sequentially using screen printing, spin coating, and pulsed laser deposition. FIG. 24 shows that pore structures, each having a micron size, a size of 200 nm to 300 nm, and a size of about 100 nm, appear sequentially. FIG. 25 is a cross-sectional structure after testing the performance of the unit cell, after the electrolyte layer, the reaction buffer layer, and the cathode were formed on the porous anode having the four-step pore-gradient structure shown in FIG. 24. It is noted that the dense electrolyte layer having a thickness of 1 micron is properly formed.

Figure 26:
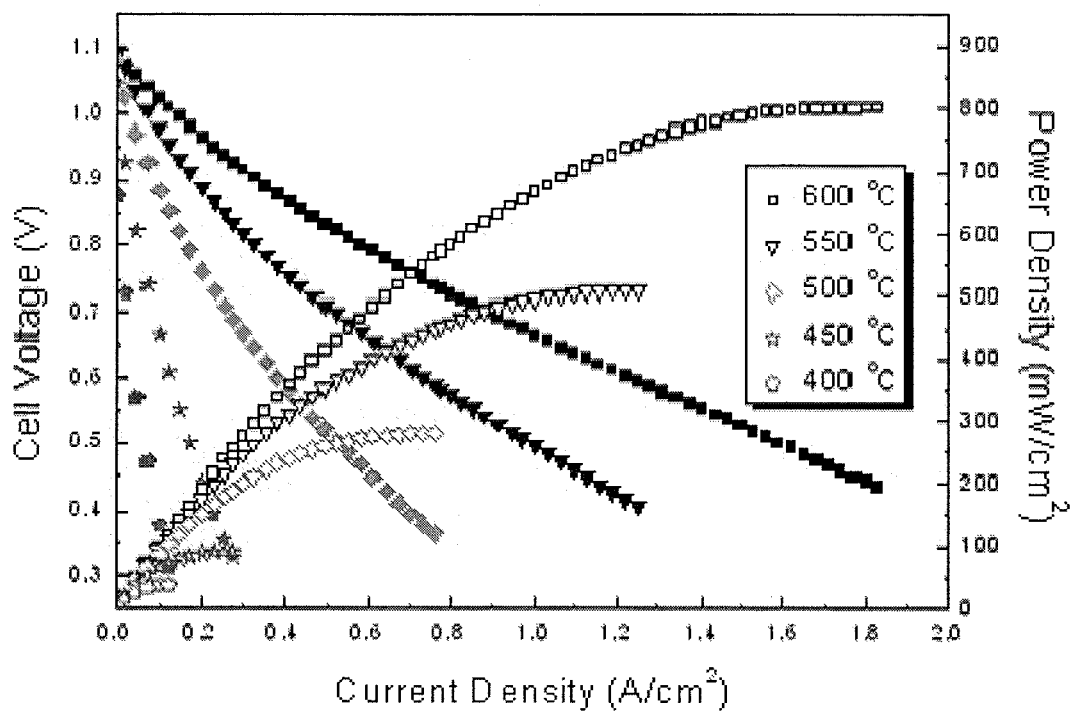
FIG. 26 is a I-V-P graph showing output performance of a thin film SOFC unit cell according to Example 3 of the present invention.

FIG. 26 is a view showing the results of evaluating the performance of the thin film SOFC unit cell fabricated by using the porous anode having the four-step pore gradient structure, in which it is noted that the OCV value is about 1.1V at 600° C. and a maximum output density is about 800 mW/cm$^2$, showing that the performance of the cell is excellent.

Example 4

Formation of nano-porous layer by electro-spray deposition (ESD) of composite nano-powder slurry A porous anode support having a two-step pore-gradient structure was fabricated in the same manner as that of Example 2.

The NiO—YSZ composite nano-powder fabricated according to the method described in Example 3 was mixed by 1 wt % to a mixture of ethanol:acetylacetone at a volume ratio of 1:1 to fabricate composite nano-powder slurry and ultrasonicated for one hour so as to be uniformly dispersed.

The surface temperature of the porous anode support was increased to 100° C., and the NiO—YSZ composite nano-powder slurry was deposited on the porous anode support through ESD.

Figure 27:
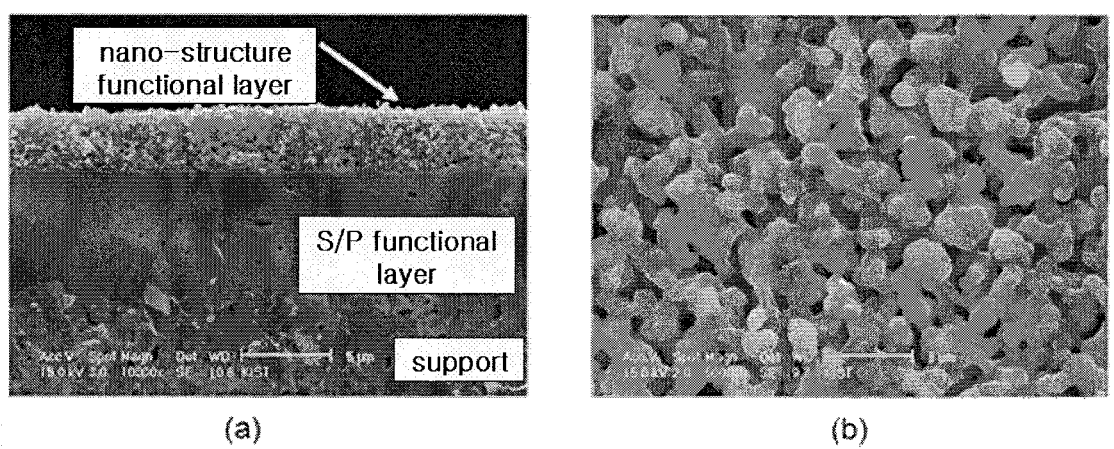
FIG. 27 is a cross-section (a) and the surface (b) of a test sample obtained by spray-depositing NiO—YSZ composite nano-powder slurry on the porous anode support having a two-step gradient structure fabricated according to a powder process and sintering the same at 1200° C. for one hour according to Example 4 of the present invention.

FIG. 27 shows images of the section (a) and the surface (b) of the test sample obtained by spray-depositing NiO—YSZ composite nano-powder slurry on the porous anode support having a two-step gradient structure fabricated according to a powder process to form the nano-porous layer and sintering the same at 1200° C. for one hour. FIG. 27(a) shows that the nano-porous layer was formed on the anode functional layer formed through screen printing (S/P).

Figure 28:
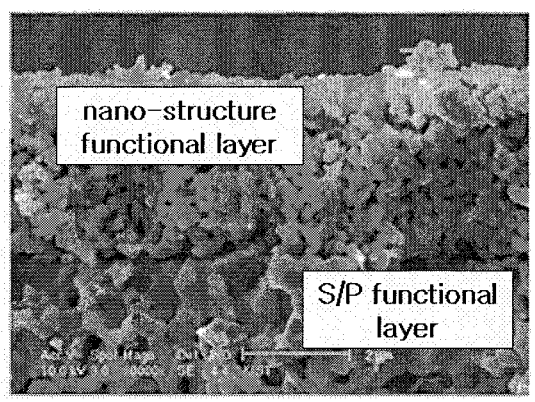
FIG. 28 is a view showing images of the cross-section (a) and the surface (b) of the test sample shown in FIG. 27 after a reduction.
Figure 28:
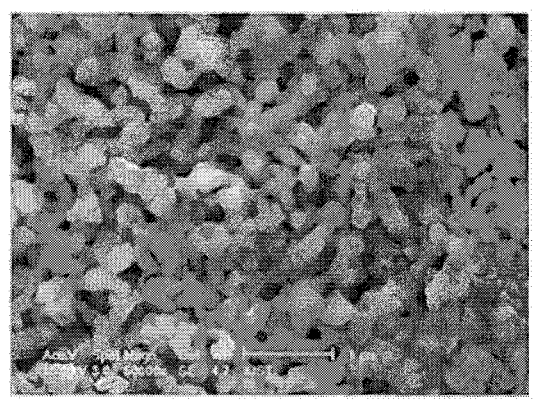

FIG. 28 is a view showing images of the section (a) and the surface (b) of the test sample shown in FIG. 27 after a reduction, in which it is noted that the pores of the nano-size after the reduction are formed to be uniformly distributed.

However, when the anode functional layer is formed only through the ESD of the composite nano-powder slurry, it has the surface as shown in FIG. 28(b), and such a surface state does not have a sufficient degree of pore size, density, or the like, of a functional layer to form an electrolyte layer of 1 micron, and without a nano-functional layer formed by vacuum deposition, it is difficult to form an electrolyte layer having a thickness of 1 micron or smaller. Thus, preferably, an additional nano-porous functional layer is deposited at an upper portion of the nano-porous functional layer formed through spray of composite nano-powder slurry through the thin film process as in Example 3 and post-annealed to form an anode functional layer configured as a nano-composite having a stabilized structure.

Alternatively, a pore-gradient structure electrolyte may be formed according to the method described in Korean Patent Application No. 2008-1000491 on the nano-porous layer formed through spray deposition of the composite nano-powder slurry without depositing the additional nano-porous functional layer through the thin film process.

Example 5

Formation of nano-porous layer through spin coating of composite nano-powder slurry The NiO—YSZ composite nano-powder slurry fabricated according to the method described in Example 3 was applied to the porous anode support having the two-step gradient structure fabricated according to the method described in Example 2. After the application, the NiO—YSZ composite nano powder slurry was dried at 200° C. for two hours and sintered at 1200° C. for two hours to form a nano-porous anode functional layer.

Figure 23:
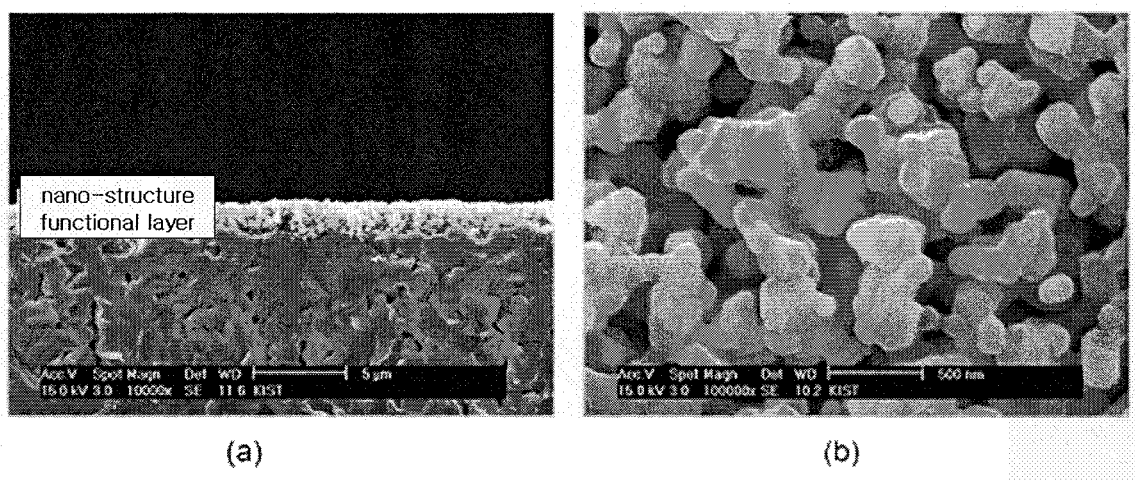
FIG. 23 is a view showing images of the cross-section (a) and the surface (b) of the test sample after forming a nano-porous layer by spin-coating NiO-YSZ composite nano-powder slurry according to Example 3 of the present invention.

FIG. 23 shows a microstructure of the cross-section (a) and the surface (b) of the sintered body. The spin layer had a thickness of two microns through single coating, and the thickness of the spin layer was adjusted to range from 2 microns to 4 microns. A coating time was 50 seconds, and a rotation speed was 2500 rpm. FIG. 11 is a photograph of the porous support with planarized surface roughness according to this method.

However, when the anode functional layer is formed only through the spin coating of the composite nano-powder slurry, it has the surface as shown in FIG. 23(b), and such a surface state does not have a sufficient degree of pore size, density, or the like, of a functional layer to form an electrolyte layer of 1 micron, and without a nano-functional layer which is formed by vacuum deposition, it is difficult to form an electrolyte layer having a thickness of 1 micron or smaller. Thus, preferably, an additional nano-porous functional layer is deposited at an upper portion of the nano-porous functional layer formed through spray of composite nano-powder slurry through the thin film process as in Example 3 and post-annealed to form an anode functional layer formed as a nano-composite having a stabilized structure.

Alternatively, a pore-gradient structure electrolyte may be formed according to the method described in Korean Patent Application No. 2008-1000491 on the nano-porous layer formed through spin coating of the composite nano-powder slurry without depositing the additional nano-porous functional layer through the thin film process to solve the problem of the porous surface structure.

The preferred embodiments of the present invention have been described with reference to the accompanying drawings, and it will be apparent to those skilled in the art that various modifications and variations can be made in the present invention without departing from the scope of the invention. Thus, it is intended that any future modifications of the embodiments of the present invention will come within the scope of the appended claims and their equivalents.

The invention claimed is:

1. An anode supported-solid oxide fuel cell (SOFC) comprising:
   a porous anode support, an electrolyte layer, and a nano-porous layer disposed between the porous anode support and the electrolyte layer, wherein a size of pores at a surface of the nano-porous layer in contact with the electrolyte layer, is smaller than a size of pores in the porous anode support and a thickness of the electrolyte layer, and the thickness of the electrolyte layer is 1 μm or less: and
   a porous intermediate layer disposed between the porous anode support and the nano-porous layer, wherein the porous intermediate layer has pores whose size is smaller than that of pores in the anode support and greater than that of pores in the nano-porous layer.

2. The cell of claim 1, wherein the nano-porous layer includes a cermet composite of a ceramic for electrolyte and metal.

3. The cell of claim 2, wherein the ceramic for electrolyte is one or more selected from the group consisting of yttria stabilized zirconia (YSZ), scandia stabilized zirconia (ScSZ), gadolinia doped ceria (GDC), samarium doped ceria (SDC), strontium manganese doped lanthanum gallate (LSGM), and silver yttria doped bismuth (YDB) oxide.

4. The cell of claim 2, wherein the metal is one or more selected from the group consisting of nickel (Ni), ruthenium (Ru), palladium (Pd), rhodium (Rd), platinum (Pt), and an alloy thereof.

5. The cell of claim 2, wherein the ceramics for electrolyte is connected to each other to form a skeleton as a structural support to prevent agglomeration of metal.

6. The cell of claim 1, wherein an average size of the pores in the nano-porous layer ranges from 30 nm to 300 nm.

7. The cell of claim 1, wherein an average size of particles of the nano-porous layer ranges from 30 nm to 300 nm.

8. The cell of claim 1, wherein the electrolyte layer is made of a material selected from the group consisting of yttria stabilized zirconia (YSZ), scandia stabilized zirconia (ScSZ), gadolinia doped ceria (GDC), samarium doped ceria (SDC), strontium manganese doped lanthanum gallate (LSGM), and silver yttria doped bismuth (YDB) oxide.

9. The cell of claim 1, wherein the porous anode support is made of a material selected from the group consisting of:
   (1) a metal selected from a group of nickel (Ni), ruthenium (Ru), palladium (Pd), rhodium (Rd), platinum (Pt), and an alloy thereof;
   (2) a cermet composite of a metal selected from (1) and a ceramics selected from a group of yttria stabilized zirconia (YSZ), scandia stabilized zirconia (ScSZ), gadolinia doped ceria (GDC), and samarium doped ceria (SDC); and
   (3) a ruthenium oxide.

10. The cell of claim 1, wherein the porous anode support has a mono-layered structure or a multi-layered structure including two or more layers having a pore-gradient structure in which a size of pores diminishes toward the nano-porous layer.

11. The cell of claim 1, wherein the nano-porous layer has a mono-layered structure or a multi-layered structure including two or more layers having a pore-gradient structure in which a size of pores diminishes toward the electrolyte layer.

12. An anode supported-solid oxide fuel cell (SOFC) comprising:
   a porous anode support;
   a porous intermediate layer;
   a nano-porous layer; and
   an electrolyte layer,
   wherein the nano-porous layer is disposed between the porous anode support and the electrolyte layer,
   wherein a size of pores at a surface of the nano-porous layer in contact with the electrolyte layer is smaller than a size of pores in the porous anode support and a thickness of the electrolyte layer, and
   wherein the porous intermediate layer disposed between the porous anode support and the nano-porous layer,
   wherein the porous intermediate layer has pores whose size is smaller than that of pores in the anode support and greater than that of pores in the nano-porous layer.

13. The cell of claim of 12, wherein the thickness of the electrolyte layer is 1 μm or less.

14. The cell of claim 12, wherein the nano-porous layer includes a cermet composite of a ceramic for electrolyte and metal.

15. The cell of claim 14, wherein the ceramic for electrolyte is one or more selected from the group consisting of yttria stabilized zirconia (YSZ), scandia stabilized zirconia (ScSZ), gadolinia doped ceria (GDC), samarium doped ceria (SDC), strontium manganese doped lanthanum gallate (LSGM), and silver yttria doped bismuth (YDB) oxide.

16. The cell of claim 14, wherein the metal is one or more selected from the group consisting of nickel (Ni), ruthenium (Ru), palladium (Pd), rhodium (Rd), platinum (Pt), and an alloy thereof.

17. The cell of claim 14, wherein the ceramics for electrolyte is connected to each other to form a skeleton as a structural support to prevent agglomeration of metal.

18. The cell of claim 12, wherein the electrolyte layer is made of a material selected from the group consisting of yttria stabilized zirconia (YSZ), scandia stabilized zirconia (ScSZ), gadolinia doped ceria (GDC), samarium doped ceria (SDC), strontium manganese doped lanthanum gallate (LSGM), and silver yttria doped bismuth (YDB) oxide.

19. The cell of claim 12, wherein the porous anode support is made of a material selected from the group consisting of:
   (1) a metal selected from a group of nickel (Ni), ruthenium (Ru), palladium (Pd), rhodium (Rd), platinum (Pt), and an alloy thereof;
   (2) a cermet composite of a metal selected from (1) and a ceramics selected from a group of yttria stabilized zirconia (YSZ), scandia stabilized zirconia (ScSZ), gadolinia doped ceria (GDC), and samarium doped ceria (SDC);
   and (3) a ruthenium oxide.

20. The cell of claim 12, wherein the porous anode support has a mono-layered structure or a multi-layered structure including two or more layers having a pore-gradient structure in which a size of pores diminishes toward the nano-porous layer.

21. The cell of claim 12, wherein the nano-porous layer has a mono-layered structure or a multi-layered structure including two or more layers having a pore-gradient structure in which a size of pores diminishes toward the electrolyte layer.

22. The cell of claim 12, wherein an average size of the pores in the nano-porous layer ranges from 30 nm to 300 nm.

23. The cell of claim 12, wherein an average size of particles of the nano-porous layer ranges from 30 nm to 300 nm.

* * * * *